US012705045B2

(12) United States Patent
Yu

(10) Patent No.: US 12,705,045 B2
(45) Date of Patent: Aug. 11, 2026

(54) TERMINAL UPGRADE METHOD AND APPARATUS

(71) Applicant: Yinwang Intelligent Technologies Co., Ltd., Shenzhen (CN)

(72) Inventor: Yinghui Yu, Shenzhen (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 370 days.

(21) Appl. No.: 18/471,639

(22) Filed: Sep. 21, 2023

(65) Prior Publication Data

US 2024/0020110 A1 Jan. 18, 2024

Related U.S. Application Data

(63) Continuation of application No. PCT/CN2021/082839, filed on Mar. 24, 2021.

(51) Int. Cl.
*G06F 8/65* (2018.01)

(52) U.S. Cl.
CPC .................................... *G06F 8/65* (2013.01)

(58) Field of Classification Search
CPC ..... G06F 8/65; G06F 8/61; G06F 8/20; G06F 16/1873; G06F 3/1225; G06F 16/219; G06F 16/23; G06F 9/4451; G06F 30/13; G06F 8/60; G06F 8/658; G06F 30/20
See application file for complete search history.

(56) References Cited

U.S. PATENT DOCUMENTS

| | | | | |
|---|---|---|---|---|
| 9,142,071 | B2 * | 9/2015 | Ricci | B60K 35/22 |
| 2016/0274893 | A1 | 9/2016 | Thomas et al. | |
| 2019/0031203 | A1 | 1/2019 | Fox | |
| 2020/0401484 | A1 | 12/2020 | Hackl | |
| 2022/0019422 | A1 * | 1/2022 | Anderson | G06F 8/60 |
| 2023/0025735 | A1 * | 1/2023 | Acharya | H04L 67/12 |

FOREIGN PATENT DOCUMENTS

| | | | |
|---|---|---|---|
| CN | 103313229 | A | 9/2013 |
| CN | 106257416 | A | 12/2016 |
| CN | 109189422 | A | 1/2019 |
| CN | 109408080 | A | 3/2019 |
| CN | 109828770 | A | 5/2019 |
| CN | 111090445 | A | 5/2020 |
| CN | 111133412 | A | 5/2020 |
| CN | 111368366 | A | 7/2020 |
| CN | 111610993 | A | 9/2020 |
| CN | 111722861 | A | 9/2020 |
| CN | 112585905 | A | 3/2021 |
| DE | 102018200318 | A1 | 7/2019 |

* cited by examiner

*Primary Examiner* — Chuck O Kendall
(74) *Attorney, Agent, or Firm* — Conley Rose, P.C.

(57) ABSTRACT

A terminal upgrade method includes a server determining a to-be-upgraded component in a terminal. The server determines at least one piece of upgrade feature information corresponding to the to-be-upgraded component. The server sends a feature upgrade package corresponding to the upgrade feature information to an upgrade manager in the terminal, so that the upgrade manager upgrades the to-be-upgraded component based on the feature upgrade package corresponding to the upgrade feature information. An upgrade may not be performed on an entire terminal. In addition, upgrading the to-be-upgraded component may be based on the feature upgrade package corresponding to the upgrade feature information.

20 Claims, 6 Drawing Sheets

TERMINAL UPGRADE METHOD AND APPARATUS

CROSS-REFERENCE TO RELATED APPLICATIONS

This is a continuation of International Patent Application No. PCT/CN2021/082839 filed on Mar. 24, 2021, the disclosure of which is hereby incorporated by reference in its entirety.

TECHNICAL FIELD

This application relates to the field of connected vehicle technologies, and in particular, to a terminal upgrade method and apparatus.

BACKGROUND

An over-the-air technology (OTA) upgrade is mainly a method for remotely managing and updating firmware in a terminal through an air interface. An operating system, a system configuration, and the like of a device may be updated by using the OTA upgrade. An OTA technology can be applied to upgrading a software product in a vehicle-mounted terminal, which is convenient and fast, and does not require a manufacturer to recall and upgrade a vehicle. This reduces costs and improves user experience.

Currently, the OTA upgrade is to upgrade the entire terminal. If an abnormal exit event occurs during the upgrade, the upgrade fails.

SUMMARY

Embodiments of this application disclose a terminal upgrade method and apparatus, to perform an upgrade based on a feature upgrade package corresponding to upgrade feature information, so that upgrade efficiency and accuracy can be improved.

According to a first aspect, an embodiment of this application discloses a terminal upgrade method, applied to a server. The server determines a to-be-upgraded component in a terminal. The server determines at least one piece of upgrade feature information corresponding to the to-be-upgraded component. The server sends a feature upgrade package corresponding to the upgrade feature information to an upgrade manager in the terminal, so that the upgrade manager upgrades the to-be-upgraded component based on the feature upgrade package corresponding to the upgrade feature information.

In this way, an upgrade may not be performed on an entire terminal, to improve an upgrade success rate. In addition, upgrade efficiency and accuracy can be improved by upgrading the to-be-upgraded component based on the feature upgrade package corresponding to the upgrade feature information.

In a possible example, the determining a to-be-upgraded component in a terminal includes receiving component information from the upgrade manager; and determining the to-be-upgraded component based on the received component information. In this way, accuracy of determining the to-be-upgraded component can be improved.

In a possible example, the component information includes software and hardware information of each component in the terminal. The determining the to-be-upgraded component based on the received component information includes comparing the received software and hardware information of the component with software and hardware information of the component in the server, to obtain the to-be-upgraded component. It may be understood that, after the upgrade manager in the terminal sends the software and hardware information of each component in the terminal to the server, the server may compare the software and hardware information of each component in the terminal with the software and hardware information of the component in the server, to determine whether the component should be upgraded and information about whether an upgrade can be performed. After it is determined that the component is a component that should be upgraded and can be upgraded in the terminal, the component is used as the to-be-upgraded component, so that accuracy of determining the to-be-upgraded component can be improved.

And/or, in a possible example, the component information includes health information of the component. The determining the to-be-upgraded component based on the received component information includes determining the to-be-upgraded component based on the received health information of the component. It may be understood that, after the upgrade manager in the terminal sends the health information of each component in the terminal to the server, the server may determine the to-be-upgraded component in the terminal based on the received health information of the component, so that accuracy of determining the to-be-upgraded component can be improved, to improve performance of using the component by the terminal.

And/or, in a possible example, the component information includes upgrade indication information of the to-be-upgraded component. The determining the to-be-upgraded component based on the received component information includes determining the to-be-upgraded component based on the upgrade indication information of the to-be-upgraded component. In other words, the server directly determines the to-be-upgraded component based on the upgrade indication information received by the upgrade manager, so that accuracy of determining the to-be-upgraded component is improved.

In a possible example, the health information of the component includes a health value of the component and/or a health level of the component. The determining the to-be-upgraded component based on the received health information of the component includes selecting, as the to-be-upgraded component, a component corresponding to the health value that is less than a preset threshold; or selecting, as the to-be-upgraded component, a component corresponding to the health level that is less than a preset level. In other words, the upgrade manager may directly determine the to-be-upgraded component based on the health value and/or the health level that are/is sent by the upgrade manager to the server, so that accuracy and efficiency of determining the to-be-upgraded component are improved, to improve performance of using the component by the terminal.

In a possible example, the determining the to-be-upgraded component based on the received health information of the component includes comparing the received health information of the component with standard health information of the component, to obtain a health value and/or a health level of the component; and selecting, as the to-be-upgraded component, a component corresponding to the health value that is less than a preset threshold, or selecting, as the to-be-upgraded component, a component corresponding to the health level that is less than a preset level. It may be understood that the server can obtain the health value and/or the health level of the component by comparing health information of each component in the terminal with the standard health information of the component that is prestored in the server. If the health value is less than the preset threshold, it indicates that the component corresponding to the health value should be upgraded, and the component corresponding to the health value is used as the to-be-upgraded component. If the health level is less than the preset level, it indicates that the component corresponding to the health level should be upgraded, and the component corresponding to the health level is used as the to-be-upgraded component. In this way, accuracy of determining the to-be-upgraded component is improved, to improve performance of using the component by the terminal.

In a possible example, before the sending a feature upgrade package corresponding to the upgrade feature information to an upgrade manager in the terminal, the method further includes receiving an upgrade request from the upgrade manager, where the upgrade request requests to receive a feature upgrade package corresponding to target upgrade feature information, the target upgrade feature information is upgrade feature information selected by a user from an upgrade activity notification displayed on a display device, and the upgrade activity notification includes the at least one piece of upgrade feature information corresponding to the to-be-upgraded component. The sending a feature upgrade package corresponding to the upgrade feature information to an upgrade manager in the terminal includes sending the feature upgrade package corresponding to the target upgrade feature information to the upgrade manager. In this way, the target upgrade feature information is selected by displaying, on the display device, the upgrade activity notification that includes the upgrade feature information, so that efficiency and accuracy of user selection can be improved. Then, the server sends the feature upgrade package corresponding to the target upgrade feature information to the upgrade manager, so that the server does not send all feature upgrade packages to the upgrade manager, to reduce an occupied memory in the upgrade manager, and improve upgrade efficiency.

In a possible example, before the receiving an upgrade request from the upgrade manager, the method further includes sending the upgrade activity notification to the upgrade manager in the terminal. It may be understood that the upgrade activity notification may indicate the upgrade manager to upgrade the to-be-upgraded component, so that upgrade accuracy can be improved.

In a possible example, the method further includes sending upgrade prompt information to the upgrade manager, where the upgrade prompt information includes estimated upgrade duration of the upgrade feature package. In this way, the user can determine, based on the upgrade prompt information displayed on the display device, installation confirmation information, for example, whether the feature upgrade package is to be upgraded, whether all or some of the feature upgrade packages are upgraded, or whether the upgrade is immediately performed or delayed, to improve upgrade accuracy.

According to a second aspect, an embodiment of this application discloses a second terminal upgrade method, applied to an upgrade manager in a terminal. The method includes receiving a feature upgrade package from a server, where the feature upgrade package corresponds to at least one piece of upgrade feature information that corresponds to a to-be-upgraded component in the terminal and that is determined by the server; and upgrading the to-be-upgraded component based on the feature upgrade package corresponding to the upgrade feature information.

In this way, an upgrade may not be performed on an entire terminal, to improve an upgrade success rate. In addition, upgrade efficiency and accuracy can be improved by upgrading the to-be-upgraded component based on the feature upgrade package corresponding to the upgrade feature information.

In a possible example, before the receiving a feature upgrade package from a server, the method further includes sending component information of each component in the terminal to the server. In this way, the server can determine, based on the component information, the to-be-upgraded component in the terminal, so that accuracy of determining the to-be-upgraded component can be improved.

In a possible example, the component information includes health information of the component. Before the sending component information of each component in the terminal to the server, the method further includes receiving the health information of the component. In other words, the health information is information directly obtained by the component, so that accuracy of obtaining the information can be improved.

Alternatively, in a possible example, the component information includes health information of the component. Before the sending component information of each component in the terminal to the server, the method further includes receiving a performance parameter of the component, and determining the health information of the component based on the performance parameter. In other words, the health information is information obtained by the upgrade manager based on the performance parameter of the component, so that accuracy of obtaining the information can be improved.

In a possible example, the method further includes sending an upgrade activity notification to a display device, so that the display device displays the upgrade activity notification, where the upgrade activity notification includes the upgrade feature information. In this way, the target upgrade feature information is selected by displaying, on the display device, the upgrade activity notification that includes the upgrade feature information, so that efficiency and accuracy of user selection can be improved.

In a possible example, after the sending an upgrade activity notification to a display device, the method further includes receiving an upgrade selection instruction from the display device, where the upgrade selection instruction includes target upgrade feature information selected by a user from the upgrade activity notification. The upgrading the to-be-upgraded component based on the feature upgrade package corresponding to the upgrade feature information includes upgrading the to-be-upgraded component based on a feature upgrade package corresponding to the target upgrade feature information. In this way, an upgrade may be performed based on the feature upgrade package corresponding to the target upgrade feature information selected by the user, so that upgrade accuracy and efficiency are improved.

In a possible example, before the receiving an upgrade selection instruction from the display device, the method further includes receiving the upgrade activity notification from the server. It may be understood that the upgrade activity notification may indicate the upgrade manager to upgrade the to-be-upgraded component, so that upgrade accuracy can be improved.

In a possible example, after the receiving an upgrade selection instruction from the display device, the method further includes sending an upgrade request corresponding to the upgrade selection instruction to the server, where the upgrade request requests to receive the feature upgrade package corresponding to the target upgrade feature information. The receiving a feature upgrade package from a server includes receiving, from the server, the feature upgrade package corresponding to the target upgrade feature information. In this way, the feature upgrade package corresponding to the target upgrade feature information is received based on the upgrade request, so that the server does not send all feature upgrade packages to the upgrade manager, to reduce an occupied memory in the upgrade manager, and improve upgrade efficiency.

In a possible example, the method further includes sending an upgrade complete message to the display device, so that the display device displays the upgrade complete message, where the upgrade complete message indicates that upgrading of the feature upgrade package is completed. In this way, the user may be informed that a feature upgrade of the to-be-upgraded component is completed, to improve user experience of human-computer interaction.

In a possible example, before the sending an upgrade complete message to the display device, the method further includes receiving the upgrade complete message from the to-be-upgraded component. In this way, the upgrade manager can conveniently manage upgrade information of the component.

In a possible example, the upgrading the to-be-upgraded component based on the feature upgrade package corresponding to the upgrade feature information includes sending the feature upgrade package to the to-be-upgraded component, so that the to-be-upgraded component upgrades the to-be-upgraded component based on the feature upgrade package. In this way, an upgrade task of the upgrade manager can be reduced, to improve upgrade efficiency and upgrade accuracy.

In a possible example, the method further includes sending upgrade prompt information to the display device, so that the display device displays the upgrade prompt information, where the upgrade prompt information includes estimated upgrade duration of the upgrade feature package. In this way, upgrade management accuracy can be improved through user participation, to improve upgrade accuracy.

In a possible example, before the sending upgrade prompt information to the display device, the method further includes receiving the upgrade prompt information from the server. In this way, the upgrade manager can determine, based on the upgrade prompt information, installation confirmation information, for example, whether the feature upgrade package is to be upgraded, whether all or some of the feature upgrade packages are upgraded, or whether the upgrade is immediately performed or delayed; or the upgrade manager can forward the upgrade information to the user, to obtain installation confirmation information from the user, so that the upgrade success rate can be improved.

In a possible example, after the sending upgrade prompt information to the display device, the method further includes receiving an upgrade confirmation instruction from the display device based on the upgrade prompt information, where the upgrade confirmation instruction includes indication information for confirming installation of the feature upgrade package. In this way, upgrade management accuracy can be improved through user participation, to improve upgrade accuracy.

According to a third aspect, an embodiment of this application discloses a third terminal upgrade method, applied to a to-be-upgraded component in a terminal. The method includes receiving a feature upgrade package from an upgrade manager in the terminal, where the to-be-upgraded component is a to-be-upgraded component that is determined by a server and that is in the terminal, and the feature upgrade package corresponds to at least one piece of upgrade feature information corresponding to the to-be-upgraded component; and upgrading the to-be-upgraded component based on the feature upgrade package. In this way, an upgrade task of the upgrade manager can be reduced, to improve upgrade efficiency and upgrade accuracy.

In a possible example, the feature upgrade package is target upgrade feature information, the target upgrade feature information is upgrade feature information selected by a user from an upgrade activity notification, and the upgrade activity notification is information sent by the upgrade manager to a display device for display, and includes the at least one piece of upgrade feature information corresponding to the to-be-upgraded component. In this way, the target upgrade feature information is selected based on the upgrade activity notification, so that upgrade accuracy can be improved.

In a possible example, the upgrade activity notification is information received by the upgrade manager from the server. The upgrade activity notification may indicate the upgrade manager to upgrade the to-be-upgraded component, so that upgrade accuracy can be improved.

In a possible example, after the upgrading the to-be-upgraded component based on the feature upgrade package, the method further includes sending an upgrade complete message to the upgrade manager, where the upgrade complete message indicates that the to-be-upgraded component completes upgrading of the feature upgrade package. In this way, the upgrade manager can conveniently manage upgrade information of the component.

According to a fourth aspect, an embodiment of this application discloses a fourth terminal upgrade method, applied to a display device. The method includes receiving an upgrade activity notification from an upgrade manager in a terminal, where the upgrade activity notification includes at least one piece of upgrade feature information of a to-be-upgraded component, and the to-be-upgraded component is a to-be-upgraded component determined by a server; displaying the upgrade activity notification; receiving an upgrade selection instruction from a user, where the upgrade selection instruction is target upgrade feature information selected by the user from the upgrade activity notification; and sending the upgrade selection instruction to the upgrade manager. In this way, the target upgrade feature information is selected by displaying, on the display device, the upgrade activity notification that includes the upgrade feature information, so that efficiency and accuracy of user selection can be improved.

In a possible example, the method further includes receiving an upgrade complete message from the upgrade manager, where the upgrade complete message indicates that upgrading of the feature upgrade package is completed; and displaying the upgrade complete message. In this way, user experience of human-computer interaction can be improved.

In a possible example, the method further includes receiving upgrade prompt information from the upgrade manager, where the upgrade prompt information includes estimated upgrade duration of the upgrade feature package; and displaying the upgrade prompt information. In this way, upgrade management accuracy can be improved through user participation, to improve upgrade accuracy.

In a possible example, the method further includes receiving an upgrade confirmation instruction from the user, where the upgrade confirmation instruction includes indication information for confirming installation of the feature upgrade package; and sending the upgrade confirmation instruction to the upgrade manager. In this way, user experience of human-computer interaction can be improved.

With reference to the first aspect, the second aspect, the third aspect, and the fourth aspect, in a possible example, the upgrade feature information includes an upgrade feature type.

With reference to the first aspect, the second aspect, the third aspect, and the fourth aspect, in a possible example, the upgrade feature information further includes feature description information corresponding to the upgrade feature type, and the feature description information includes at least one of the following a recommendation level, an involved function, an involved component, estimated upgrade duration, an upgrade reason, and an upgrade category.

According to a fifth aspect, an embodiment of this application discloses a first terminal upgrade apparatus, used in a server, and including a unit configured to perform the method according to the first aspect.

The server mentioned in embodiments of this application may be a server or a server cluster including a plurality of servers. Specifically, the server may be a server that centrally stores an upgrade package, or may be a server cluster erected in a distributed manner that includes a distributed storage upgrade package, group configuration information, or upgrade policy information. For example, a distributed server may be the server cluster including the plurality of servers, and the cluster may include a cloud computing server, a content delivery network (CDN) server, a Network Time Protocol (NTP), a Domain Name System (DNS) server, and the like. These servers may coordinate with each other to jointly complete functions such as computing, data storage, and communication. For ease of description, the server, the distributed server, and the server cluster are collectively referred to as a server in embodiments of this application.

In embodiments of this application, the server is configured to provide an OTA service, and is specifically configured to send an upgrade notification message to a to-be-upgraded terminal, or send an upgrade package or the like to a terminal or an upgrade manager in a terminal. This is not limited herein. In some specific implementation scenarios, the server may be referred to as an OTA server or an OTA cloud.

According to a sixth aspect, an embodiment of this application discloses a second terminal upgrade apparatus, used in an upgrade manager in a terminal, and including a unit configured to perform the method according to the second aspect.

According to a seventh aspect, an embodiment of this application discloses a third terminal upgrade apparatus, used in a to-be-upgraded component in a terminal, and including a unit configured to perform the method according to the third aspect.

According to an eighth aspect, an embodiment of this application discloses a fourth terminal upgrade apparatus, used in a display device, and including a unit configured to perform the method according to the fourth aspect.

According to a ninth aspect, an embodiment of this application discloses a fifth terminal upgrade apparatus, including a processor and a memory and a communication interface that are connected to the processor. The memory is configured to store one or more programs, and is configured to support the processor in performing the steps in any one of the foregoing aspects.

According to a tenth aspect, an embodiment of this application discloses a terminal, including the upgrade manager according to the sixth aspect and the to-be-upgraded component according to the seventh aspect.

In a possible example, the terminal further includes the display device according to the eighth aspect.

In embodiments of this application, the terminal may include but is not limited to a transportation vehicle like a vehicle, an intelligent cockpit product, an uncrewed aerial vehicle, or a robot in a computer system (or an in-vehicle system), or a personal computer, a server computer, a handheld or laptop device, a mobile device (for example, a cell phone, a mobile phone, a tablet computer, a personal digital assistant, or a media player), a consumer electronic device, a minicomputer, or mainframe computer.

The terminal may include one or more components, and the component may include one or more upgrade managers and one or more display devices. When the terminal is a vehicle, the component may further include modules that can be upgraded, such as an electronic control unit (ECU), a telematics BOX (T-box, or referred to as a TCU), a dashboard camera ECU, an antilock brake system (ABS), a human-machine interface (HMI), a gateway (GW), a domain controller (DC) of a functional domain or a location domain, a vehicle integrated/integration unit (VIU), a vehicle computing unit, a vehicle computing unit, a processor, a vehicle cloud communication component, a BLUETOOTH module, a central computing platform, an audio module, a video module, a battery system, a sensor, and a map module. This is not limited herein.

In a possible example, the terminal includes a vehicle.

In a possible example, the to-be-upgraded component includes the ECU.

According to an eleventh aspect, an embodiment of this application discloses a terminal upgrade system, including the terminal according to the tenth aspect and the server according to the fifth aspect.

In a possible example, the system further includes the display device according to the eighth aspect.

According to a twelfth aspect, an embodiment of this application discloses a computer-readable storage medium. The computer-readable storage medium stores instructions. When the instructions are run on a computer, the computer is enabled to perform the method according to any one of the foregoing aspects.

According to a thirteenth aspect, an embodiment of this application discloses a computer program product. The computer program product is configured to store a computer program. When the computer program is run on a computer, the computer is enabled to perform the method according to any one of the foregoing aspects.

According to a fourteenth aspect, an embodiment of this application discloses a first chip, including a processor and a memory. The processor is configured to invoke instructions from the memory and run the instructions stored in the memory, so that a device in which the chip is installed performs the method according to any one of the foregoing aspects.

According to a fifteenth aspect, an embodiment of this application discloses a second chip, including an input interface, an output interface, and a processing circuit. The input interface, the output interface, and the processing circuit are connected by using an internal connection path. The processing circuit is configured to perform the method according to any one of the foregoing aspects.

According to a sixteenth aspect, an embodiment of this application discloses a third chip, including an input interface, an output interface, a processor, and optionally, a memory. The input interface, the output interface, the processor, and the memory are connected by using an internal connection path. The processor is configured to execute code in the memory. When the code is executed, the processor is configured to perform the method according to any of the foregoing aspects.

According to a seventeenth aspect, an embodiment of this application discloses a chip system, including at least one processor, a memory, and an interface circuit. The memory, a transceiver, and the at least one processor are interconnected by using a line, and the at least one memory stores a computer program. The computer program is used by the processor to perform the method according to any of the foregoing aspects.

BRIEF DESCRIPTION OF DRAWINGS

The following describes the accompanying drawings used in embodiments of this application.

DESCRIPTION OF EMBODIMENTS

The following describes embodiments of this application with reference to the accompanying drawings in embodiments of this application.

Figure 1:
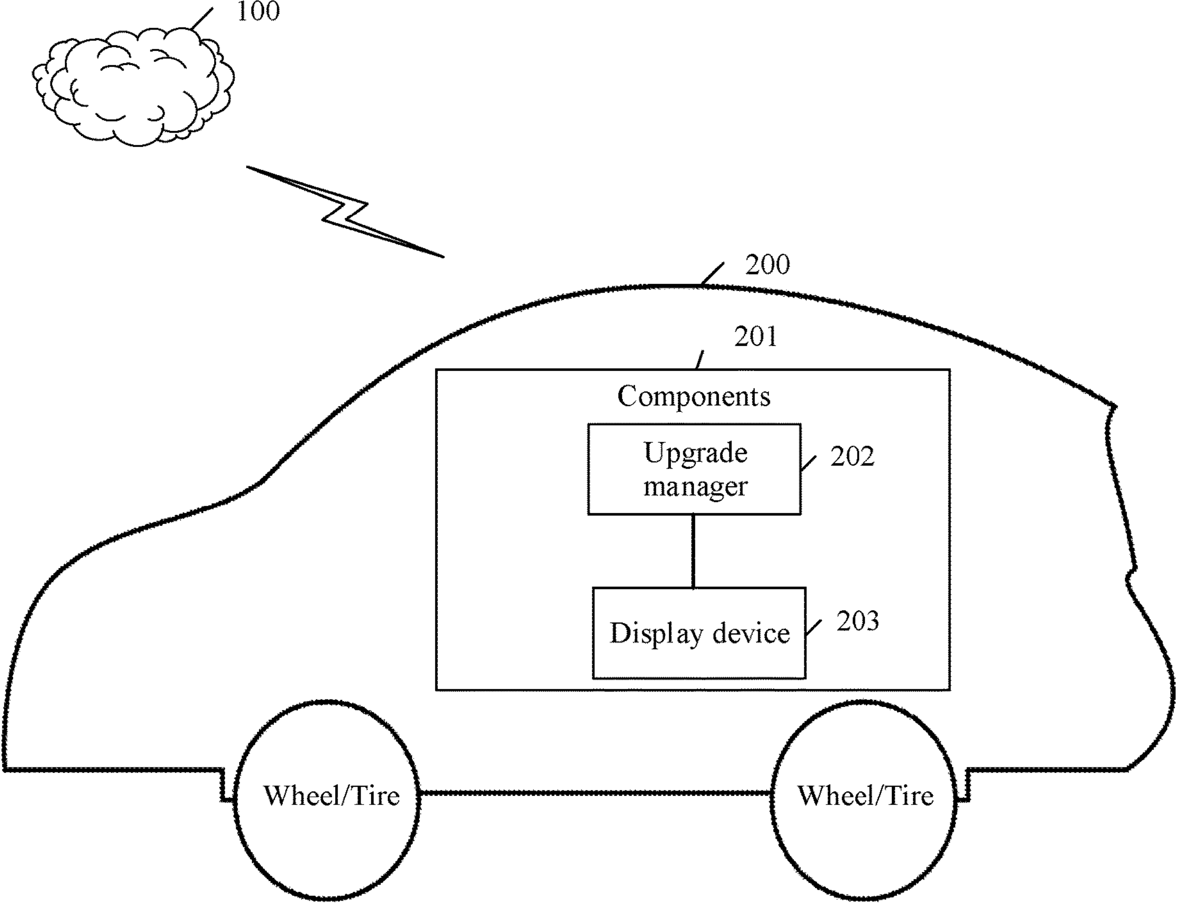
FIG. 1 is a diagram of a system architecture of a terminal upgrade method applied to an embodiment of this application.

FIG. 1 is a diagram of a system architecture of a terminal upgrade method applied to an embodiment of this application. As shown in FIG. 1, the system includes a server 100 and a terminal 200. A quantity of servers 100 and a quantity of terminals 200 are not limited in this application. One server 100 may be connected to one or more terminals 200, and one terminal 200 may be connected to one or more servers 100. The server 100 may be a server or a server cluster including a plurality of servers. Specifically, the server 100 may be a server that centrally stores an upgrade package, or may be a server cluster erected in a distributed manner that includes a distributed storage upgrade package, group configuration information, or upgrade policy information. For example, a distributed server may be the server cluster including the plurality of servers, and the cluster may include a cloud computing server, a CDN server, an NTP, a DNS server, and the like. These servers may coordinate with each other to jointly complete functions such as computing, data storage, and communication. For ease of description, the server, the distributed server, and the server cluster are collectively referred to as a server in embodiments of this application. In FIG. 1, that the server 100 is a cloud server is used for description.

In embodiments of this application, the server 100 is configured to provide an OTA service, and is specifically configured to send an upgrade notification message to the to-be-upgraded terminal 200, or send an upgrade package or the like to the terminal 200 or an upgrade manager 202 in the terminal 200. This is not limited herein. In some specific implementation scenarios, the server 100 may be referred to as an OTA server or an OTA cloud.

In embodiments of this application, the terminal may include but is not limited to a transportation vehicle like a vehicle, an intelligent cockpit product, an uncrewed aerial vehicle, or a robot in a computer system (or an in-vehicle system), or a personal computer, a server computer, a handheld or laptop device, a mobile device (for example, a cell phone, a mobile phone, a tablet computer, a personal digital assistant, or a media player), a consumer electronic device, a minicomputer, or mainframe computer. In FIG. 1 and this application, the terminal 200 is used as an example for description.

As shown in FIG. 1, the terminal 200 may include one or more components 201, and the components 201 may include one or more upgrade managers 202, one or more display devices 203, and the like. A connection line between the upgrade manager 202, the display device 203, and another component in the components 201 is not limited in this application. The connection line may be an Ethernet-based bus, a Controller Area Network (CAN) bus, a Local Interconnect Network (LIN) bus, a Media-Oriented System Transport (MOST) bus, or FlexRay. In addition, there is another bus connection manner, even a wireless connection manner, or the like.

When the terminal 200 is a vehicle, the components 201 may further include modules that can be upgraded, such as an ECU, a T-box, a dashboard camera ECU, an ABS, an HMI, a GW, a DC of a functional domain or a location domain, a VIU, a vehicle computing unit, a vehicle computing unit, a processor, a vehicle cloud communication component, a Bluetooth module, a central computing platform, an audio module, a video module, a battery system, a sensor, and a map module. This is not limited herein.

The ECU, also be referred to as an electronic control module (ECM), an electronic control unit, or a vehicle-mounted computer, is an embedded system in an automotive electronic system and controls one or more electrical systems or subsystems in the vehicle. The ECU may include a microcontroller unit (MCU), a memory (for example, a read-only memory (ROM) or a random-access memory (RAM)), an input/output interface, an analog-to-digital converter (ADC or A/D converter), and shaping, drive and other large-scale integrated circuits.

The MCU, also referred to as a single chip microcomputer or a chip microcomputer, is a chip-level computer formed by appropriately reducing a frequency and specifications of a central processing unit (CPU) and integrating, to a single chip, peripheral interfaces such as a memory, a timer, a universal serial bus (USB), an A/D converter, a universal asynchronous receiver/transmitter, a programmable logic controller (PLC), a direct memory access (DMA), and even a liquid crystal display (LCD) drive circuit, to perform different combinations on different application scenarios.

The RAM is mainly configured to store variable data during a calculator operation. For example, the RAM is configured to store input and output data of a computer and intermediate data generated in a computer process. RAM data disappears when a power supply is cut off. The ROM is configured to store fixed data, for example, a permanently stored program and data stored by a manufacturer at a time during vehicle production, such as engine fuel injection characteristic pulse spectrum and ignition characteristic pulse spectrum. ROM data does not disappear when the power supply is cut off.

The A/D converter converts an analog signal into a digital signal that can be processed by the MCU. Most signals sent by the sensor are analog signals. The A/D converter converts a voltage signal preprocessed through an input loop into the digital signal, and then sends the converted digital signal to the MCU. The MCU is a center of the ECU. As required, the MCU calculates and processes an input signal by using a memory program and data, and sends a processing result to an output loop.

The ECU is a computing device configured to control the vehicle and perform a decision-making control function. For example, the ECU is connected to a bus and communicates with another device through the bus. For another example, the ECU may obtain information transmitted by an internal sensor, an external sensor, a map database, and an HMI device, and output corresponding information to the HMI and the processor.

In an actual application, the ECU may include one or more ECUs. The ECU may recognize a static and/or dynamic target around the vehicle, for example, obtain a target monitoring result by using an external sensor. The ECU may monitor an attribute like a speed and a direction of a surrounding target. The ECU may obtain status information of the vehicle based on output information of the internal sensor. Based on the information, the ECU plans a driving route, and outputs a corresponding control signal to the processor. Then the processor performs corresponding lateral and longitudinal movements.

A type of the ECU is not limited in this application. The ECU may include an engine control module (ECM), a powertrain control module (PCM), a transmission control module (TCM), a brake control module (BCM), an electronic brake control module (EBCM), a central control module (CCM), a central timing module (CTM), a general electronic module (GEM), a body control module (BCM), a suspension control module (SCM), a control unit, or a control module. The ECU may include one or more computers, or may be ECUs corresponding to different components. For example, the PCM may be used as an ECU corresponding to an engine, or may be used as an ECU corresponding to a transmission. The ECU may further include a drive system ECU, a T-box ECU, a transmission ECU, a dashboard camera ECU, an ABS ECU, a door ECU, a window ECU, a lamp ECU, a lock ECU, a horn ECU, a sunroof ECU, an instrument panel ECU, and the like. Each type of ECU is configured to manage a component corresponding to the ECU. For example, the drive system ECU is configured to manage a drive system and coordinate functions of the drive system. For example, the drive system ECU may be configured to start the drive system or shut down the drive system. For another example, the T-box ECU is configured to manage the T-box, and the transmission ECU is configured to manage the transmission. For another example, the door ECU, the window ECU, the lamp ECU, the lock ECU, the horn ECU, and the sunroof ECU may be respectively configured to manage opening or closing of a door, a window, a lamp, a lock, a horn, a sunroof, and the like, and the instrument panel ECU may be configured to manage opening or closing of an instrument panel and display information.

The engine is configured to power a vehicle, and is a machine that converts energy of a specific type into mechanical energy. A function of the engine is to convert chemical energy of liquid or gas combustion into heat energy through combustion, convert the heat energy into the mechanical energy through expansion, and output power. A working principle of the engine is to control fuel mixing and ignition timing based on a feedback signal of a sensor connected to the engine. To be specific, based on a speed and a load of the engine, the engine control module, the powertrain control module, the brake control module, or the engine ECU performs calculation and processing, and sends action instructions to a fuel injector, a fuel supply pump, and the like, to ensure that each cylinder has the most appropriate fuel injection amount, fuel injection rate, and fuel injection time and ensure the best combustion of each cylinder.

A new energy vehicle is powered by a motor drive system. Compared with a combination of an engine and a transmission of a conventional fossil fuel-powered vehicle, the biggest advantage of a pure electric drive new energy vehicle is a flexible arrangement of a motor. The pure electric drive new energy vehicle may support a single-motor drive scheme, a multi-motor drive scheme, or even a distributed hub motor (wheel-side motor) drive scheme. Through the flexible combination, vehicle space is released to the maximum extent on the premise of ensuring economy and power of the vehicle.

The T-box may also be referred to as an in-vehicle infotainment system, a telematics processor, a vehicle gateway, or the like. This is not limited in embodiments of this application. The T-box is mainly used for communication between an outside of a vehicle with a background system or another terminal (for example, a mobile phone), and may further control display of vehicle information. When a user sends a control instruction by using a vehicle control application (application, app), the background system (for example, a server) forwards the received control instruction to the T-box ECU, the central control module, the general electronic module, the body control module, the control unit, the control module, or the like. After obtaining the control instruction, these ECUs send a control packet through a CAN bus to control the vehicle, for example, starting an engine, turning on an air conditioner, adjusting a seat to a proper position, opening a door/window/light/lock/horn/sunroof of the vehicle, and finally feeding back an operation result to a terminal corresponding to the user. In addition, the T-box ECU can also read data of each ECU through the CAN bus, such as a vehicle status report, a driving report, fuel consumption statistics, a violation query, a location track, driving behavior, and the like, and transmit the data to the background system through a network. The background system forwards the data to a terminal corresponding to the user, to view by the user.

The transmission is configured to change a mechanism of a rotational speed and torque of the engine, and can fix or grade a transmission ratio of an output shaft to an input shaft. A transmission component may include a variable speed transmission mechanism, a control mechanism, a power output mechanism, and the like. Through the transmission control module or the transmission ECU, a value and direction of the torque and rotational speed can be changed, and the transmission mechanism can be controlled to change the transmission ratio, that is, gear shifting can be performed to achieve a variable speed and torque.

The dashboard camera is a device configured to record an image, a sound, travel time, a speed, a location, and other related information of a vehicle during traveling, and may include a host, a speed sensor, data analysis software, and the like. For example, when the vehicle is traveling, the speed sensor collects a wheel speed, and sends speed information to the dashboard camera ECU, the central control module, the general electronic module, the body control module, the control unit, or the control module through the CAN bus, to control the dashboard camera to display a speed of the vehicle.

The ABS is configured to automatically control braking force of a brake when a vehicle is braking, so that the wheels are not locked and are in a rolling and sliding state (a slip rate is about 20%), to ensure the maximum adhesion between the wheels and the ground. In the braking process, when the ABS ECU, the central control module, the general electronic module, the body control module, the control unit, or the control module determines, based on a wheel speed signal inputted by a wheel speed sensor, that a wheel tends to lock, the ABS is controlled to enter an antilock braking pressure adjustment process.

In embodiments of this application, the upgrade manager 202 is configured to implement communication between the server 100 and the terminal 200, for example, receive an upgrade activity notification, the upgrade package, or the like from the server 100. The upgrade manager 202 is further configured to control the display device to implement human-computer interaction, for example, control the display device to display the upgrade activity notification, and receive an upgrade selection instruction or an upgrade rejection instruction that is triggered by the user on the display device based on the upgrade activity notification. The upgrade manager 202 is further configured to control the terminal 200 to upgrade, for example, upgrade, based on the upgrade package from the server 100, an ECU corresponding to the upgrade package. This is not limited herein.

The upgrade manager 202 may include one or more upgrade managers. The upgrade manager 202 may be referred to as an OTA master module. The OTA master module may include the T-box, the DC, the VIU, the vehicle computing unit, the processor, and the like. This is not limited herein. The OTA master module is configured to control and manage an upgrade of the ECU in the vehicle. There may be one or more OTA master modules, and the OTA master modules may be configured on one or more nodes (for example, the GW, the T-box, the DC, or the processor) of the terminal 200. The DC is an ECU similar to a controller, usually a domain controller that controls one or more functions. The DC may include a cockpit domain controller (CDC), a mobile data center (MDC), a vehicle domain controller (VDC), and the like. This is not limited herein.

In embodiments of this application, the display device is configured to display OTA upgrade related information, including information exchanged between the terminal 200 and the server 100, information exchanged between the upgrade manager 202 and the server 100, information exchanged between the upgrade manager 202 (for example, the OTA master module) and a component (for example, an ECU) in the terminal 200, or locally displayed information of a component (for example, an ECU) in the terminal 200. This is not limited in this application. For example, the information may be the upgrade activity notification sent by the server. A location of the display device is not limited in this application. As shown in FIG. 1, the display device may be located in the terminal 200, and may be any one or more HMIs installed in the terminal 200, for example, a head-up display (HUD), an instrument panel, and a display dedicated to a passenger. The display device 203 may be further configured to display information input by the user or information provided for the user, various menu interfaces of the vehicle, and the like.

Figure 2:
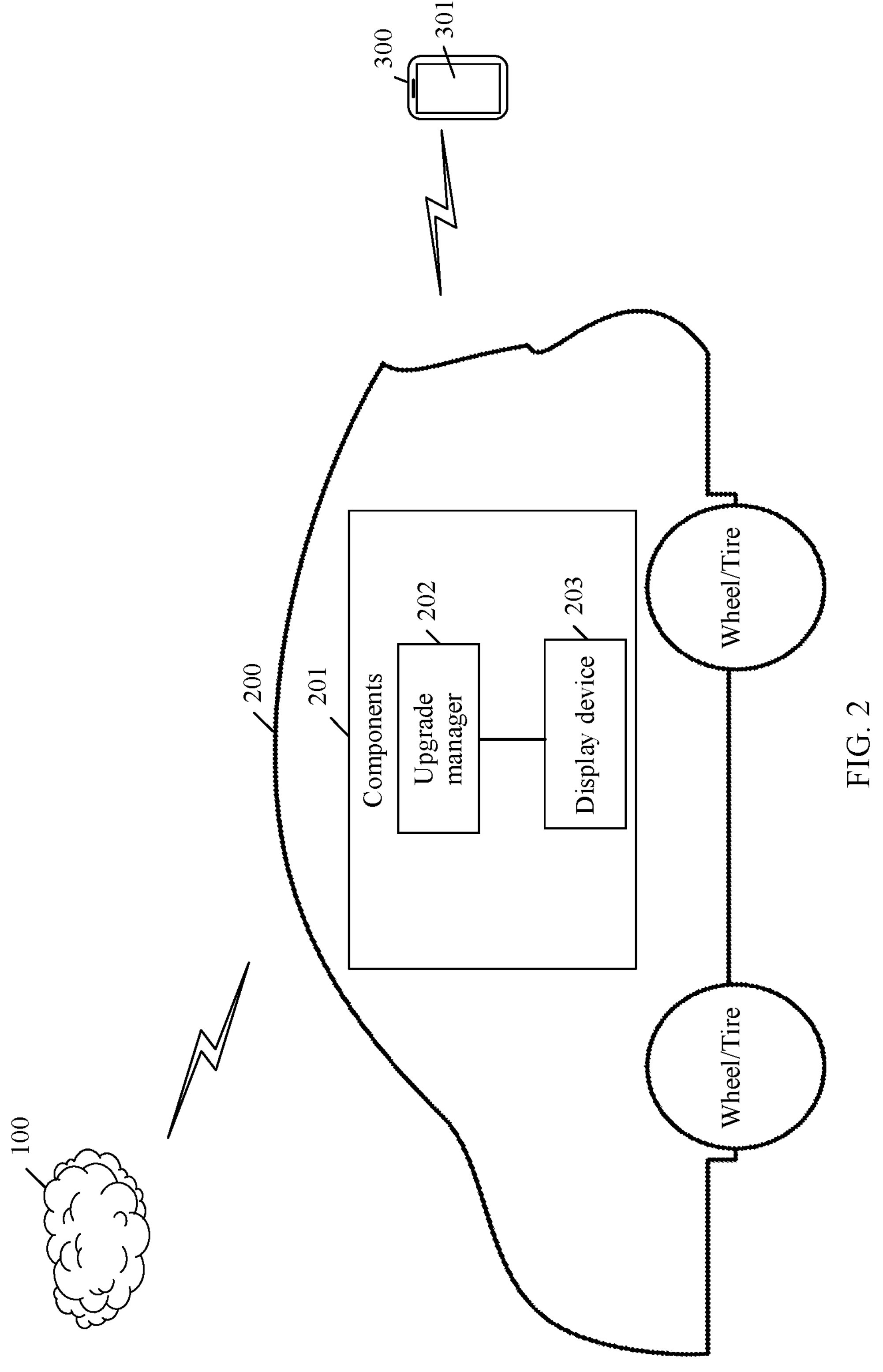
FIG. 2 is a diagram of a system architecture of another terminal upgrade method applied to an embodiment of this application.

The display device may alternatively be located in another terminal 300 shown in FIG. 2 that is wirelessly connected to the terminal 200, for example, a display device 301. It should be noted that the display device 301 in the another terminal 300 is not the display device 203 in the terminal 200, and may be located inside or outside the terminal 200. This is not limited herein. A type of the another terminal is not limited in this application, and the another terminal may be at least one of the foregoing terminal types. In FIG. 2, the another terminal is described by using a mobile phone as an example.

It may be understood that, in the system architecture diagram shown as FIG. 1, the user may obtain the upgrade activity notification from the display device 203 in the terminal 200, so that timeliness of the upgrade can be improved. However, in the system architecture diagram shown as FIG. 2, the user may obtain the upgrade activity notification from the display device 301 in the another terminal 300, so that a user (for example, a passenger) other than the terminal 200 may perform human-computer interaction. When the user is a user who knows a to-be-upgraded component, upgrade accuracy can be improved. When the terminal is a vehicle, a driver can be prevented from being distracted in a driving process, to avoid a potential safety hazard. A vehicle owner or a user who knows an upgrade of a component or an ECU in the vehicle may alternatively determine a component or an ECU that should be upgraded, so that upgrade accuracy can be improved.

In embodiments of this application, the terminal 200 may further include a memory and a processor (not shown in the figure). The memory may mainly include a program storage area and a data storage area. The program storage area may store an operating system, an application required by at least one function (for example, an image collection function), and the like. The data storage area may store data (for example, audio data, text information, and image data) and the like created based on use of the terminal 200. In addition, the memory may include a high-speed RAM, and may further include a nonvolatile memory, for example, at least one disk storage device, a flash storage device, or another volatile solid-state storage device.

The processor is a control center of the terminal 200, and is connected to all parts of the entire terminal 200 through various interfaces and lines. By running or executing software program and/or data that are/is stored in the memory, the processor performs various functions of the terminal 200 and processes data, to implement overall monitoring on the terminal 200. The processor may include one or more processing units. For example, the processor may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors.

The NPU is a neural-network (NN) computing processor. The NPU quickly processes input information by referring to a structure of a biological neural network, for example, a transfer mode between human brain neurons, and may further continuously perform self-learning. The NPU may implement intelligent cognition of the vehicle 10 and other applications, for example, image recognition, facial recognition, speech recognition, and text understanding.

In some embodiments, the processor may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a USB interface, and/or the like.

The I2C interface is a two-way synchronization serial bus, and includes one serial data line (SDA) and one serial clock line (SCL). In some embodiments, the processor may include a plurality of groups of I2C buses. The processor may be separately coupled to a touch sensor, a charger, a flash, a camera, and the like through different I2C bus interfaces. For example, the processor may be coupled to the touch sensor through the I2C interface, so that the processor communicates with the touch sensor through the I2C bus interface, to implement a touch function of the terminal 200.

The I2S interface may be configured to perform audio communication. In some embodiments, the processor may include a plurality of groups of I2S buses. The processor may be coupled to the audio module through the I2S bus, to implement communication between the processor and the audio module. In some embodiments, the audio module may send an audio signal to a Wi-Fi module through the I2S interface, to implement a function of answering a call through a Bluetooth headset.

The PCM interface may be configured to perform audio communication, and sample, quantize, and encode an analog signal. In some embodiments, the audio module may be coupled to the Wi-Fi module through a PCM bus interface. In some embodiments, the audio module may send an audio signal to the Wi-Fi module through the PCM interface, to implement a function of answering a call through a Bluetooth headset. Both the I2S interface and the PCM interface are configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is generally configured to connect the processor and the Wi-Fi module. For example, the processor communicates with a Bluetooth module in the Wi-Fi module through the UART interface, to implement a Bluetooth function. In some embodiments, the audio module may send an audio signal to the Wi-Fi module through the UART interface, to implement a function of playing music through a Bluetooth headset.

The MIPI interface may be configured to connect a processor to a peripheral component like a display device and a camera. The MIPI interface includes a camera serial interface (CSI), a display serial interface (DSI), and the like. In some embodiments, the processor communicates with the camera through the CSI interface, to implement a photographing function of the terminal 200. The processor communicates with the display device through the DSI interface, to implement a display function of the terminal 200.

The GPIO interface may be configured by software. The GPIO interface may be configured for control signals or data signals. In some embodiments, the GPIO interface may be configured to connect the processor to the camera, the display device, the Wi-Fi module, the audio module, a sensor module, and the like. The GPIO interface may alternatively be configured as an I2C interface, an I2S interface, a UART interface, an MIPI, or the like.

The USB interface is an interface that conforms to a USB standard specification, and may be specifically a mini USB interface, a micro USB interface, a USB type-C interface, or the like. The USB interface may be configured to connect to a charger to charge another terminal, or may be configured to exchange data between the terminal 200 and another terminal, or may be configured to connect to a headset, and play audio by using the headset. The USB interface may further be configured to connect to the another terminal, for example, an augmented reality (AR) device.

It can be understood that an interface connection relationship between the modules illustrated in embodiments of this application is merely an example for description, and does not constitute a limitation on the structure of the terminal 200. In some other embodiments of this application, the terminal 200 may alternatively use an interface connection manner different from that in the foregoing embodiments or a combination of a plurality of interface connection manners.

In addition, the terminal 200 may further include a power supply configured to supply power to another module. The terminal 200 may further include a radio frequency (RF) circuit configured to perform network communication with a wireless network device, and may further include the Wi-Fi module configured to perform Wi-Fi communication with another device, to obtain, for example, images or data transmitted by the another device.

The terminal 200 may further include other possible functional modules such as a flashlight, a Bluetooth module, an external interface, a button, and a motor, although not shown in FIG. 1 and FIG. 2. Details are not described herein again.

An embodiment of this application provides a terminal upgrade method. The method may be performed by a terminal upgrade apparatus. The apparatus may be implemented by software and/or hardware, and may be used in the system shown in FIG. 1 or FIG. 2.

Before specific implementations of embodiments of this application are described, terms related to embodiments of this application are first described.

(1) Software and Hardware Information of a Component

In embodiments of this application, the software and hardware information of the component includes software information and hardware information of the component. The software and hardware information of the component and information included in the software and hardware information are not limited in this application. The software information of the component may include a software name, a software version, software content, software compatibility, a software upgrade record, security verification data, and the like of the component. The software name describes a name of software of the component, and the software version describes a version number of the software of the component. The software name and the software version may be set by a vendor corresponding to the software of the component. The software content includes content of upgrade software itself, including an entire upgrade software package, differential upgrade software package, policy and privacy text related to a software upgrade package, and the like. The software compatibility may include compatible software, a hardware requirement of the software, or the like. The security verification data is used to ensure security of the upgrade software. For example, the security verification data includes integrity check data, a key, and the like. The integrity check data is used to check whether the upgrade software is tampered with, and the key is used to decrypt the received upgrade software. The software upgrade record describes software upgrade information of the component, for example, time of the latest upgrade, whether the upgrade is successful, a reason of an upgrade failure, and upgrade package information. If a feature upgrade package corresponding to target upgrade feature information is selected, the software upgrade record may further include a feature that is successfully upgraded, a feature that fails to be upgraded, a reason of the failed feature, whether the failed feature should be upgraded again, and the like.

The hardware information of the component may include a hardware identifier, a hardware type, hardware compatibility information, a firmware upgrade record, and the like of the component. The hardware identifier of the component identifies hardware of the component, and may include a number set for a component inside a vehicle, for example, an identifier of the component (for example, an identifier of an ECU, which may be referred to as an EUC identifier, an ECU ID). The hardware identifier of the component may further include an identifier of the hardware of the component, for example, a serial number of the hardware. The hardware identifier of the component may further include a number corresponding to the component, for example, a component number. The hardware type describes a name or a type of hardware or a module corresponding to the component. The hardware compatibility information may include a compatible vehicle model, a compatible module, a compatible component type (for example, a compatible ECU model), and the like. The firmware upgrade record describes firmware upgrade information of the component, for example, time of the latest upgrade, whether the upgrade is successful, a reason of an upgrade failure, and upgrade package information. If a feature upgrade package corresponding to target upgrade feature information is selected, the software upgrade record may further include a feature that is successfully upgraded, a feature that fails to be upgraded, a reason of the failed feature, whether the failed feature should be upgraded again, and the like.

(2) Upgrade Package Information of a Component

In embodiments of this application, the upgrade package information of the component may include an upgrade package name, an involved function, an involved component, an upgrade reason, an upgrade feature, an upgrade level, an upgrade category, an upgrade package size, and the like. The upgrade package information of the component and information included in the upgrade package information are not limited in this application. The upgrade package name describes a name of an upgrade package of the component, and may be obtained by naming based on a version number of the upgrade package and a name of the component. The upgrade package size includes a memory occupied by the upgrade package, a memory occupied by installing the upgrade package, or the like.

The involved function includes a function of a to-be-upgraded component, a function affected by an upgrade, a function associated with running of a to-be-upgraded component, and the like. When the involved function includes a plurality of functions, the involved function may further include an upgrade association relationship between the functions, for example, whether the functions are independent of each other or associated with each other. If the functions are associated with each other, the involved function may further include an upgrade sequence relationship between a plurality of involved functions. If the functions are independent of each other, the involved function may further include respective upgrade priorities of independent upgrade packages, mutual upgrade priority information, and the like. The involved component includes the to-be-upgraded component, a component affected by the upgrade, a component associated with running of the component, and the like. When the involved component includes a plurality of components, the involved component may further include an upgrade association relationship between the components, for example, whether the components are independent of each other or associated with each other. If the components are associated with each other, the involved component may further include an upgrade sequence relationship between a plurality of involved components. If the components are independent of each other, the involved component may further include respective upgrade priorities of independent upgrade packages, mutual upgrade priority information, and the like.

The upgrade reason may be obtained by classifying a device that performs active triggering, for example, a terminal (for example, a vehicle) that performs active triggering, an upgrade manager that performs active triggering, a user who performs active triggering, a server that performs active triggering, or the like. The upgrade reason may be obtained by classifying an upgrade function change, for example, bug fixing, a new function, interaction interface optimization, improvement of an existing function and performance, a map update, and a security information update of an upgrade package.

The upgrade feature describes a function and a feature affected by the upgrade, and can be obtained by classifying upgrade packages based on the involved function or the involved component. When the terminal is a vehicle, the upgrade feature may include autonomous driving, an interaction interface, a drive system, a battery system, a cockpit system, a computing center, a map update, and a security information update, or a security class, an entertainment class, an experience class, and a performance class. The security class may be further classified into a function security class, an information security class, and the like. This is not limited herein. The function safety class includes function or component safety, for example, bug fixing. The information security class includes security of information in a vehicle or of information of the user, for example, information related to information security like a privacy policy or verification data.

The upgrade level can be classified into a basic level, a recommended level, and a complete level. The basic level can meet daily needs, the recommended level can meet most of the needs, and the complete level can meet all the needs. A quantity of users is used as an example. The basic level is suitable for all users. A quantity of users for whom the recommended level is suitable is less than a quantity of users for whom the basic level is suitable, but more than a quantity of users for whom the complete level is suitable. The upgrade level may further be classified into a first level, a second level, a third level, and the like. A representation form of the upgrade level is not limited in this application. An upgrade package of each upgrade level reflects different upgrade scopes of a same to-be-upgraded component. It may be understood that, a smaller or lower-level upgrade package indicates that the upgrade package includes more basic content and is more recommended to the user; a larger or higher-level upgrade package indicates that the upgrade package includes richer content and may be recommended to a user with larger memory and a higher requirement. Alternatively, a lower-level upgrade package indicates that the upgrade package is more recommended to the user. This is not limited herein. This application is described by using an example in which a higher-level upgrade package indicates that the upgrade package is more recommended to the user. In addition, a method for determining the upgrade level is not limited in this application, and may be determined based on a feature of the upgrade package and an actual situation of the vehicle (for example, usage duration of the vehicle, running duration of the vehicle, or remaining memory space).

The upgrade category may be obtained by classifying based on the upgrade reason, the upgrade feature, the upgrade level, firmware-over-the-air (FOTA), software-over-the-air (SOTA), or the like.

(3) Upgrade Activity Notification, Upgrade Feature Information, Upgrade Feature Type, and Feature Description Information In embodiments of this application, the upgrade activity notification describes information that a component (for example, an ECU in a vehicle) in a terminal is to be upgraded. In other words, the upgrade activity notification describes upgrade information of a to-be-upgraded component (for example, a to-be-upgraded ECU). The upgrade activity notification may include at least one piece of upgrade feature information corresponding to the to-be-upgraded component, namely, at least one piece of upgrade feature information of the to-be-upgraded component. In addition, each piece of upgrade feature information may include an upgrade feature type. Optionally, the upgrade feature information may further include feature description information corresponding to the upgrade feature type, and the like. This is not limited herein.

The upgrade feature type describes a feature type of an upgrade package, for example, bug fixing, a new function, interaction interface optimization, improvement of an existing function and performance, or a map update based on an upgrade reason; autonomous driving, an interaction interface, a drive system, a battery system, a cockpit system, a computing center, a map update, and a security information update, or a security class, an entertainment class, an experience class, a performance class, and an update class based on an upgrade feature; FOTA or SOTA based on an upgrade category; a basic upgrade, a recommended upgrade, and a complete upgrade, or a first grade, a second grade, and a third grade based on an upgrade level.

The feature description information describes feature information of an upgrade feature type, and may include at least one of the following a recommendation level, an involved function, an involved component, estimated upgrade duration, an upgrade reason, and an upgrade category. For the involved function, the involved component, the upgrade reason, and the upgrade category, refer to the foregoing definitions or a subsequent supplement. Details are not described herein again.

The recommendation level describes a level recommended to a user, including an optional level and a mandatory level, a normally recommended level and a highly recommended level, or a first level, a second level, and a third level. A higher recommendation level indicates that this level is more recommended to the user. Alternatively, a lower recommendation level indicates that this level is more recommended to the user. In this application, for example, the higher recommendation level indicates that this level is more recommended to the user. Otherwise, reference can be made to the foregoing descriptions similarly, and details are not described again. The estimated upgrade duration describes a time period required from downloading a feature upgrade package to completing installation, and may be determined according to one or more of a network rate of a terminal, a remaining memory of a terminal, a memory currently occupied in a terminal, or hardware information of a terminal or a component. This is not limited herein.

The feature description information can be understood as feature information of an upgrade package except the upgrade feature type. For example, when the upgrade feature type is bug fixing in the upgrade reason, the feature description information may include the recommendation level, the involved function, the involved component, the estimated upgrade duration, the upgrade category, and the like. For another example, when the upgrade feature type is FOTA in the upgrade category, the feature description information may include the recommendation level, the involved function, the involved component, the estimated upgrade duration, the upgrade reason, and the like.

(4) Health Information

The health information describes health information of an entire terminal, or health information of each component in a terminal. For example, when the terminal is a vehicle, the health information may include a performance parameter in a braking state of the vehicle, like a health state of a hot axle (including a bearing), brake cylinder pressure, a control valve, brake shoe relief, or coupler impact force, or health information corresponding to the performance parameter. The health information may be represented by a health value, and the health value may be a ratio of a detected performance parameter of a component to a performance parameter of the component in an ideal state. For example, if a performance parameter of an ECU is closer to a performance parameter of the ECU in the ideal state, it indicates a better health status corresponding to health information of the ECU; otherwise, it indicates a worse health status.

The health information may alternatively be represented by a health level each corresponding to different health values for components. The health level and a status corresponding to the health level are not limited in this application. For example, the health level corresponding to the health value less than 60% is poor, and indicates that an update should be performed. The health level corresponding to the health value greater than or equal to 60% and less than or equal to 80% is medium, and indicates that an update is recommended. The health level corresponding to the health value greater than or equal to 80% and less than or equal to 1 is excellent, and indicates that an update is not required temporarily. Specific percentages for the health levels can be flexibly adjusted based on user requirements. The percentages here are only an example, and do not constitute any limitation on other percentage settings.

Figure 3:
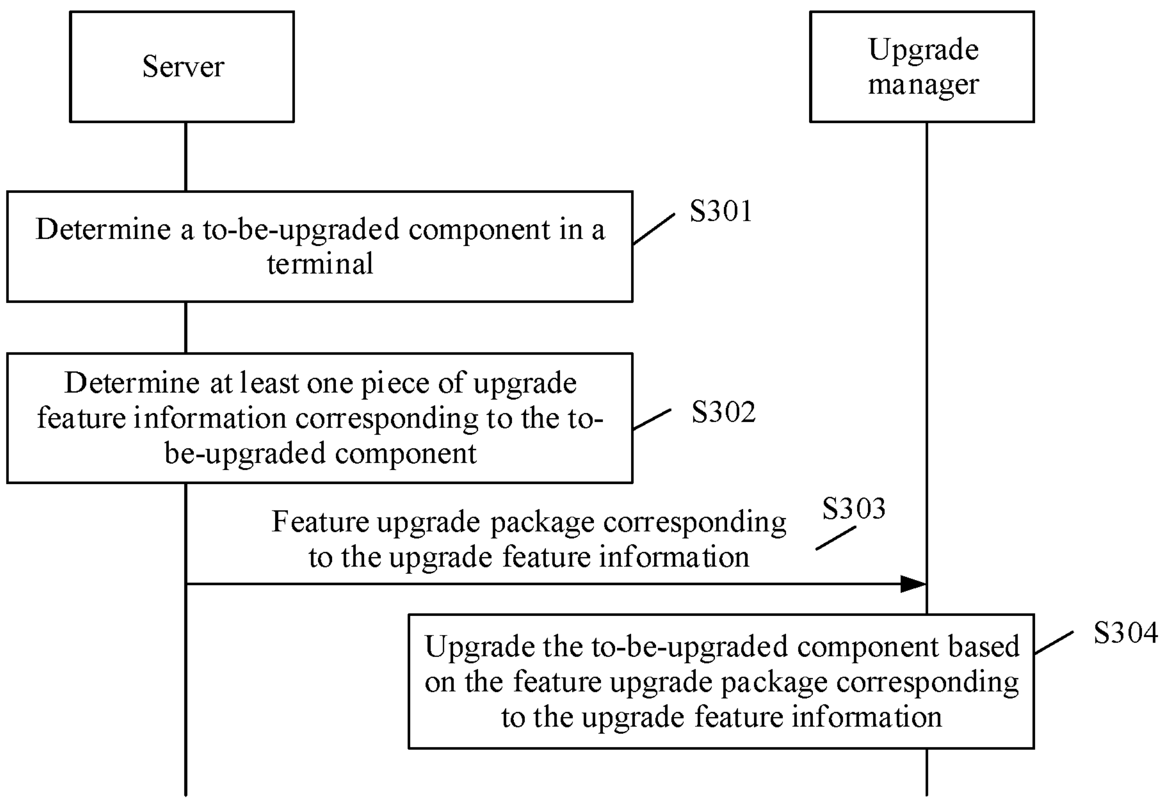
FIG. 3 is a schematic flowchart of a terminal upgrade method according to an embodiment of this application.

FIG. 3 is a schematic flowchart of a terminal upgrade method according to an embodiment of this application. The method includes but is not limited to the following steps S301 to S304.

S301: A server determines a to-be-upgraded component in a terminal.

In this embodiment of this application, the to-be-upgraded component may be the to-be-upgraded component in the terminal. For description of the component, refer to the foregoing definition or a subsequent supplement. Details are not described herein again. For example, when the terminal is a vehicle, the to-be-upgraded component may be a to-be-upgraded ECU in the vehicle. The to-be-upgraded component may be a component whose firmware or software is to be upgraded, a component to be upgraded based on an upgrade reason like a new function, bug fixing, or function improvement, a component to be upgraded based on autonomous driving, an interaction interface, a drive system, a battery system, a cockpit system, a computing center, a map, or security information, or based on an upgrade feature like a security class, an entertainment class, an experience class, or a performance class, or a component to be upgraded based on an upgrade level like a basic upgrade, a recommended upgrade, a complete upgrade, or based on a first level, a second level, a third level, or the like. A type of the to-be-upgraded component is not limited in this application. In addition, a quantity of to-be-upgraded components is not limited in this application, and may be greater than or equal to 1.

A method for determining the to-be-upgraded component is not limited in this application. In a possible example, step S301 includes the server receives component information from an upgrade manager in the terminal. The server determines the to-be-upgraded component based on the received component information.

The component information may include software and hardware information of each component in the terminal. For the software and hardware information, refer to the foregoing definition or a subsequent supplement. Details are not described herein again. The software and hardware information of each component in the terminal may be obtained from a software upgrade record and a firmware upgrade record of the terminal that are stored in the server, or may be actively sent by the upgrade manager in the terminal to the server, or the like. The upgrade manager may send the software and hardware information of each component in the terminal to the server when the terminal is in use or preset duration expires, after the server sends, to the upgrade manager, an instruction for obtaining the software and hardware information of each component in the terminal, or the like. A method for sending the component information by the upgrade manager is not limited in this application. The preset duration may be duration specified by the server or the upgrade manager, or may be dynamic duration determined by the server or the upgrade manager. In other words, the duration is not a specific value. The duration may be determined by the server or the upgrade manager based on a software update period, use duration of the component or the terminal, and the like. This is not limited herein. It may be understood that the to-be-upgraded component in the terminal is determined based on the component information of the terminal sent by the upgrade manager, so that accuracy of determining the to-be-upgraded component can be improved.

In a possible example, that the server determines the to-be-upgraded component based on the received component information includes the server compares the received software and hardware information of the component with software and hardware information of the component in the server, to obtain the to-be-upgraded component.

It may be understood that, after the upgrade manager in the terminal sends the software and hardware information of each component in the terminal to the server, the server may compare the software and hardware information of each component in the terminal with the software and hardware information of the component in the server, to determine whether the component should be upgraded and information about whether an upgrade can be performed. After it is determined that the component is a component that should be upgraded and can be upgraded in the terminal, the component is used as the to-be-upgraded component, so that accuracy of determining the to-be-upgraded component can be improved.

In this embodiment of this application, the component information may include upgrade package information of each component in the terminal. In a possible example, that the server determines the to-be-upgraded component based on the received component information includes the server compares the received upgrade package information of the component with the upgrade package information of the component in the server, to obtain the to-be-upgraded component.

For the upgrade package information, refer to the foregoing definitions or a subsequent supplement. Details are not described herein again. It may be understood that information about whether the component should be upgraded and can be upgraded can be obtained by comparing upgrade package information for installing each component in the terminal with the upgrade package information of the component in the server. After it is determined that the component is the component that should be upgraded and can be upgraded in the terminal, the component is used as the to-be-upgraded component, so that accuracy of determining the to-be-upgraded component can be improved.

In this embodiment of this application, the component information may include health information of each component in the terminal. In a possible example, that the server determines the to-be-upgraded component based on the received component information includes the server determines the to-be-upgraded component based on the health information of the component.

For the health information, refer to the foregoing definition or a subsequent supplement. Details are not described herein again. A method for obtaining the health information is not limited in this application. In a possible example, the upgrade manager receives the health information of the component. Alternatively, the upgrade manager receives a performance parameter of the component, and determines the health information of the component based on the performance parameter. In other words, the health information may be information directly obtained by the component, or may be information obtained by the upgrade manager based on the performance parameter of the component. In this way, the health information may be information sent by the upgrade manager to the server after the upgrade manager obtains the health information of the component, or information forwarded by the upgrade manager to the server after the upgrade manager receives the health information from the component.

It may be understood that an upgrade should be performed as soon as possible when a health status of a component in the terminal is faulty. In this example, after the upgrade manager in the terminal sends the health information of each component in the terminal to the server, the server may determine the to-be-upgraded component in the terminal based on the received health information of the component, so that accuracy of determining the to-be-upgraded component can be improved, to improve performance of using the component by the terminal.

A method for determining the to-be-upgraded component based on the health information is not limited in this application. In a possible example, the server compares the received health information of the component with standard health information of the component, to obtain a health value and/or a health level of the component. The server selects, as the to-be-upgraded component, a component corresponding to the health value that is less than a preset threshold. Alternatively, the server selects, as the to-be-upgraded component, a component corresponding to the health level that is less than a preset level.

The standard health information of the component is health information that is of the component in an ideal state and that is pre-stored by the server, and may include the performance parameter in the ideal state, and the like. This is not limited herein. The preset threshold or the preset level is limited in this application. For example, when the vehicle includes a first ECU, a second ECU, and a third ECU, and health values of the first ECU, the second ECU, and the third ECU are respectively 50%, 80%, and 70%, if the preset threshold is 60%, it is determined that the first ECU is the to-be-upgraded component. When the health level corresponding to the health value less than 60% is poor, the health level corresponding to the health value greater than or equal to 60% and less than or equal to 80% is medium, and the health level corresponding to the health value greater than or equal to 80% and less than or equal to 1 is excellent, health levels of the first ECU, the second ECU, and the third ECU are respectively poor, excellent, and medium. If the preset level is medium, the first ECU and the third ECU are determined as to-be-upgraded components.

It may be understood that, in this example, the health value and/or the health level of the component can be obtained by comparing the health information of each component in the terminal with the standard health information of the component that is pre-stored in the server. If the health value is less than the preset threshold, it indicates that the component corresponding to the health value should be upgraded, and the component corresponding to the health value is used as the to-be-upgraded component. If the health level is less than the preset level, it indicates that the component corresponding to the health level should be upgraded, and the component corresponding to the health level is used as the to-be-upgraded component. In this way, accuracy of determining the to-be-upgraded component is improved, to improve performance of using the component by the terminal.

In a possible example, the health information includes a health value and/or a health level. The server selects, as the to-be-upgraded component, a component corresponding to the health value that is less than a preset threshold, or selects, as the to-be-upgraded component, a component corresponding to the health level that is less than a preset level. In other words, the health information sent by the upgrade manager to the server is the health value and/or the health level. In this way, the upgrade manager can directly determine the to-be-upgraded component based on the health value and/or the health level, so that accuracy and efficiency of determining the to-be-upgraded component are improved, to improve performance of using the component by the terminal.

In this embodiment of this application, the component information may include upgrade indication information of the to-be-upgraded component, and the upgrade indication information indicates that the to-be-upgraded component should be upgraded. In a possible example, that the server determines the to-be-upgraded component based on the received component information includes the server determines the to-be-upgraded component based on the upgrade indication information of the to-be-upgraded component.

The upgrade indication information may be information actively sent by the component to the upgrade manager, information sent by a user to the upgrade manager by using a display device, or the like. This is not limited herein. It may be understood that, if the server receives the upgrade indication information of the to-be-upgraded component that is sent by the upgrade manager, the server can determine that the to-be-upgraded component in the terminal is the to-be-upgraded component corresponding to the upgrade indication information. In other words, the server directly determines the to-be-upgraded component based on the upgrade indication information received by the upgrade manager, so that accuracy of determining the to-be-upgraded component is improved.

It should be noted that the component information may include one or more of the software and hardware information of the component, the upgrade package information of the component, the health information of the component, and the upgrade indication information of the to-be-upgraded component. Implementations of the component information constitute no limitation on embodiments of this application. In an actual application, the to-be-upgraded component may alternatively be determined in another implementation. For example, the to-be-upgraded component is determined based on the software and hardware information and the health information of the component, or a reference component is first determined based on the software and hardware information of the component, and then the to-be-upgraded component is determined from the reference component based on the upgrade indication information of the to-be-upgraded component. This is not limited herein.

S302: The server determines at least one piece of upgrade feature information corresponding to the to-be-upgraded component.

In this embodiment of this application, the to-be-upgraded component corresponds to the at least one piece of upgrade feature information, and each piece of upgrade feature information includes an upgrade feature type. Optionally, the upgrade feature information further includes feature description information corresponding to the upgrade feature type. The feature description information may include at least one of the following: a recommendation level, an involved function, an involved component, estimated upgrade duration, an upgrade reason, an upgrade category, and the like. For specific content, refer to the foregoing definition or a subsequent supplement. Details are not described herein again. A method for determining the upgrade feature type and optional feature description information is not limited in this application. In a possible example, the at least one piece of upgrade feature information corresponding to the to-be-upgraded component is determined based on a preset category.

The preset category may include but is not limited to at least one of the following: the upgrade reason, the upgrade feature, the upgrade level, the upgrade category, the involved function, the involved component, an upgrade package size, and the like. For the foregoing information, refer to the foregoing description. Details are not described herein again. It may be understood that different upgrade feature information corresponding to the to-be-upgraded component may be obtained based on different preset categories, so that classification diversity can be improved, to improve efficiency of selecting the upgrade feature by the user. In addition, a to-be-upgraded component that may be upgraded by the user or the terminal may be obtained by setting different preset categories, to improve accuracy of upgrading the component.

In a possible example, the at least one piece of upgrade feature information corresponding to the to-be-upgraded component is determined based on the preset category and the upgrade package information of the to-be-upgraded component. For the preset category and the upgrade package information, refer to the foregoing descriptions. Details are not described herein again. It may be understood that the upgrade package information of the to-be-upgraded component may be differently classified based on different preset categories, to obtain different upgrade feature types of the to-be-upgraded component, so that classification diversity can be improved, to improve efficiency of selecting the upgrade feature by the user.

Refer to Table 1 to Table 5. Table 1, Table 4, and Table 5 respectively show upgrade feature types corresponding to the upgrade reason, the upgrade level, and the upgrade category of the preset category, and feature description information corresponding to the upgrade feature types. Table 2 and Table 3 respectively show an upgrade feature type corresponding to the upgrade feature of the preset category and feature description information corresponding to the upgrade feature type. It can be seen from Table 5 that a same upgrade feature type may correspond to different recommendation levels. A quantity of each item in the feature description information is not limited in embodiments of this application. It may be understood that the information in Table 1 to Table 5 is merely an example, and may be adjusted based on an actual application situation. This is not limited in embodiments of this application.

TABLE 1

| Upgrade feature type | Feature description information | | |
|---|---|---|---|
| | Recommendation level | Involved component/ Involved function | Estimated upgrade duration |
| Bug fixing | Strongly recommended | for example, the drive system and a sensor | 10 minutes |
| New function | Recommended | for example, a location domain controller and a gateway | 20 minutes |
| Interaction interface optimization | Recommended | for example, a video module and an HMI | 10 minutes |
| Improvement of an existing function and performance | Recommended | for example, the drive system | 5 minutes |
| Map update | Recommended | for example, a map module | 15 minutes |
| Security information update | Strongly recommended | for example, information related to information security like a privacy policy or verification data | 20 minutes |

TABLE 2

| Upgrade feature type | Feature description information | | |
|---|---|---|---|
| | Recommendation level | for example, the upgrade reason | Estimated upgrade duration |
| Autonomous driving | Mandatory | for example, bug fixing | 10 minutes |
| Interaction interface | Optional | for example, improvement of an existing function | 20 minutes |
| Power system | Optional | for example, the new function | 5 minutes |
| Battery system | Optional | for example, improvement of an existing function | 5 minutes |
| Map update | Optional | for example, the new function | 8 minutes |
| Security information update | Mandatory | for example, information related to information security like a privacy policy or verification data | 10 minutes |

TABLE 3

| Upgrade feature type | Feature description information | | |
|---|---|---|---|
| | Recommendation level | Upgrade reason | Estimated upgrade duration |
| Security class | Strongly recommended | for example, bug fixing or information related to information security like a privacy policy or verification data | 20 minutes |
| Entertainment class | Strongly recommended | for example, improvement of an existing function | 30 minutes |
| Experience class | Recommended | for example, the new function | 10 minutes |
| Performance class | Recommended | for example, improvement of an existing function | 20 minutes |

TABLE 4

| Upgrade feature type | Feature description information | | | |
|---|---|---|---|---|
| | Recommendation level | Upgrade reason | Involved component/ Involved function | Estimated upgrade duration |
| Basic upgrade package | Mandatory | for example, bug fixing, the map update, and the security information update | for example, a functional domain controller, a location domain controller, and the map | 20 minutes |
| Recommended upgrade package | Optional | for example, bug fixing, the map update, the new function, improvement of an existing function, and the security information update | for example, a functional domain controller, a location domain controller, the map, the battery system, and the drive system | 40 minutes |
| Complete upgrade package | Optional | for example, bug fixing, the new function, improvement of an existing function, interaction interface optimization, the map update, and the security information update | for example, the HMI, a vehicle cloud communication component, a functional domain controller, a location domain controller, a gateway, a central computing platform, an audio module, a video module, the battery system, the drive system, a sensor, a map, and other ECUs | 50 minutes |

TABLE 5

| Feature description information | | | | |
|---|---|---|---|---|
| Upgrade feature type | Feature description information | | | |
| | Recommendation level | Upgrade reason | Involved component/ Involved function | Estimated upgrade duration |
| FOTA | Strongly recommended | for example, bug fixing | for example, the drive system and a sensor | 10 minutes |
| | Recommended | for example, the new function | for example, a location domain controller and a gateway | 20 minutes |
| SOTA | Recommended | for example, interaction interface optimization | for example, a video module and an HMI | 10 minutes |
| | Recommended | for example, improvement of an existing function and performance | for example, the drive system | 5 minutes |
| | Recommended | for example, the map update | for example, a map module | 15 minutes |
| | Strongly recommended | for example, the security information update | for example, information related to information security like a privacy policy or verification data | 20 minutes |

A method for determining the recommendation level is not limited in this application. In a possible example, the server determines an importance level of the to-be-upgraded component based on the preset category and the upgrade package information of the to-be-upgraded component. The server determines the recommendation level based on the importance level.

The importance level describes importance of a current upgrade of the to-be-upgraded component to the terminal, and may include an importance level of hardware and/or an importance level of software, and the like. This is not limited herein. A method for determining the importance level is not limited in this application. In a possible example, an upgrade evaluation value of the to-be-upgraded component is determined based on the upgrade package information of the to-be-upgraded component, an associated value between the preset category and an upgrade category of the to-be-upgraded component is determined, the upgrade evaluation value and the associated value are weighted weighed to obtain an importance value, and the importance level is determined based on a level corresponding to the importance value.

The upgrade evaluation value may be an evaluation value of an upgrade package of the to-be-upgraded component, or may be an evaluation value corresponding to effect on the terminal caused by upgrading the to-be-upgraded component, and may be determined based on health information, security, user experience, or the like. This is not limited herein. The security may include security of using the terminal (for example, traveling security of a vehicle), or security of information stored in the terminal. User experience may include user experience in using the terminal, for example, user experience in driving a vehicle and using an ECU in a vehicle. The associated value describes a relationship between the preset category and the upgrade category, and may be determined by using a matching value between the preset category and the upgrade category, and the like. This is not limited herein.

It may be understood that, in this example, weighting is performed on the upgrade evaluation value of the to-be-upgraded component determined based on the upgrade package information of the to-be-upgraded component, and the associated value between the preset category and the upgrade category of the to-be-upgraded component to obtain the importance value, so that accuracy of determining the importance value can be improved. Then, the importance level is determined based on the level corresponding to the importance value, to improve accuracy of determining the importance level.

A method for determining the recommendation level based on the importance level is not limited in embodiments of this application. A mapping relationship between the importance level and the recommendation level may be pre-stored, so that the recommendation level corresponding to the importance level may be obtained after the importance level is determined.

It may be understood that information about the current upgrade of the to-be-upgraded component, for example, the upgrade reason, the upgrade feature, the upgrade category, the involved function, or the involved component, may be determined based on the upgrade package information of the to-be-upgraded component, to determine necessity of upgrading the to-be-upgraded component. Then, the upgrade package information of the to-be-upgraded component is analyzed based on the preset category, so that necessity of upgrading the to-be-upgraded component may be further determined, to further improve the importance level of the to-be-upgraded component. After the recommendation level is determined based on the importance level, accuracy of determining the recommendation level can be improved.

In another possible example, the server determines a user upgrade preference corresponding to the terminal. The server determines the recommendation level based on an importance level and the user upgrade preference.

The user upgrade preference may include at least one of the upgrade reasons, the upgrade feature, the upgrade level, the upgrade category, the involved function, and the involved component, and may be determined based on a frequent upgrade type in a historical user upgrade record, a function or a component commonly used by the user, or the like. This is not limited herein.

It may be understood that, in this example, the recommendation level is determined based on the user upgrade preference corresponding to the terminal and the importance level of the to-be-upgraded component, in other words, a recommended upgrade is performed based on user preference, so that accuracy of selecting the to-be-upgraded component can be improved.

It should be noted that the foregoing embodiment of determining the recommendation level does not constitute a limitation on embodiments of this application. In an actual application, the recommended level may be determined in another implementation.

S303: The server sends a feature upgrade package corresponding to the upgrade feature information to the upgrade manager.

S304: The upgrade manager upgrades the to-be-upgraded component based on the feature upgrade package corresponding to the upgrade feature information.

A method for installing the feature upgrade package is not limited in this application. An upgrade may be completed by using the upgrade manager, the to-be-upgraded component, a component corresponding to the to-be-upgraded component, or the like. This is not limited herein. In a possible example, step S304 includes the upgrade manager sends a feature upgrade package to the to-be-upgraded component, so that the to-be-upgraded component upgrades the to-be-upgraded component based on the feature upgrade package. It may be understood that, after the upgrade manager sends the feature upgrade package corresponding to the upgrade feature information to the to-be-upgraded component, the to-be-upgraded component upgrades the to-be-upgraded component based on the feature upgrade package corresponding to the upgrade feature information, so that an upgrade task of the upgrade manager can be reduced, and upgrade efficiency and upgrade accuracy can be improved.

In the method described in FIG. 3, after determining the to-be-upgraded component in the terminal, the server determines the at least one piece of upgrade feature information corresponding to the to-be-upgraded component, and then sends the feature upgrade package corresponding to the upgrade feature information to the upgrade manager. Then, the upgrade manager upgrades the to-be-upgraded component based on the feature upgrade package corresponding to the upgrade feature information. In this way, an upgrade may not be performed on an entire terminal, to improve an upgrade success rate. In addition, upgrade efficiency and accuracy can be improved by upgrading the to-be-upgraded component based on the feature upgrade package corresponding to the upgrade feature information.

In a possible example, the method further includes the server sends upgrade prompt information to the upgrade manager.

The upgrade prompt information includes estimated upgrade duration of the upgrade feature package and upgrade precaution, for example, a restart is not allowed during the upgrade. The upgrade prompt information may be sent by the server to the upgrade manager before step S304, or may be sent by the server to the upgrade manager when the upgrade manager prepares for the upgrade, or may be sent by the server to the upgrade manager after the upgrade manager sends an upgrade prompt request to the server, or the like. This is not limited herein.

It may be understood that, after the server sends the upgrade prompt information to the upgrade manager, the upgrade manager can determine, based on the upgrade prompt information, installation confirmation information, for example, whether the feature upgrade package is to be upgraded, whether all or some of the feature upgrade packages are upgraded, or whether the upgrade is immediately performed or delayed; or the upgrade manager can forward the upgrade information to the user, to obtain installation confirmation information from the user, so that the upgrade success rate can be improved.

In a possible example, the method further includes the upgrade manager sends upgrade prompt information to the display device.

It may be understood that, after the upgrade manager sends the upgrade prompt information to the display device, the user may determine, based on the upgrade prompt information displayed on the display device, installation confirmation information, for example, whether the feature upgrade package is to be upgraded, whether all or some of the feature upgrade packages are upgraded, or whether the upgrade is immediately performed or delayed. In this way, upgrade management accuracy can be improved through user participation, to improve upgrade accuracy.

In a possible example, after the upgrade manager sends the upgrade prompt information to the display device, the method further includes the display device displays the upgrade prompt information, receives an upgrade confirmation instruction from the user, and sends the upgrade confirmation instruction to the upgrade manager.

The upgrade confirmation instruction includes indication information for confirming installation of the feature upgrade package, and may include confirming installation time of the feature upgrade package, for example, performing installation immediately, or reminding again next time, or performing an upgrade after XX minutes, or performing an upgrade after XX hours.

It may be understood that, after the server sends the upgrade prompt information to the upgrade manager, the upgrade manager may send the upgrade prompt information to the display device, so that the user determines, based on the upgrade prompt information displayed on the display device, installation confirmation information, for example, whether the feature upgrade package is to be upgraded, whether all or some of the feature upgrade packages are upgraded, or whether the upgrade is immediately performed or delayed. After determining the installation confirmation information of the feature upgrade package, the user performs an operation on the display device to generate the upgrade confirmation instruction. Then, the display device sends the upgrade confirmation instruction to the upgrade manager, so that the upgrade manager performs upgrade management based on indication information in the upgrade confirmation instruction. In this way, upgrade management accuracy can be improved through user participation, to improve upgrade accuracy.

In a possible example, the method further includes the upgrade manager sends an upgrade complete message to the display device, and the display device displays the upgrade complete message.

The upgrade complete message indicates that upgrading of the feature upgrade package is completed. It may be understood that, by displaying the upgrade complete message on the display device, the user may be informed that a feature upgrade of the to-be-upgraded component is completed, to improve user experience of human-computer interaction. It should be noted that, if the feature upgrade package is upgraded by the to-be-upgraded component, the upgrade complete message specifically indicates that the to-be-upgraded component completes upgrading of the feature upgrade package. If the feature upgrade package is upgraded by the upgrade manager, the upgrade complete message specifically indicates that the upgrade manager completes upgrading of the feature upgrade package.

In a possible example, before the upgrade manager sends the upgrade complete message to the display device, the method further includes the to-be-upgraded component sends the upgrade complete message to the upgrade manager.

It may be understood that, after a feature upgrade package of the to-be-upgraded component is upgraded, the upgrade complete message indicating that the feature upgrade package of the to-be-upgraded component is upgraded is sent to the upgrade manager, so that the upgrade manager manages upgrade information of the component.

In a possible example, after the display device displays the upgrade complete message, the method further includes the display device receives an acknowledgment message from the user. The acknowledgment message indicates that the user knows that the feature upgrade of the to-be-upgraded component is completed. In this way, the display device receives the confirmation message from the user, so that user experience of human-computer interaction can be improved.

Figure 4:
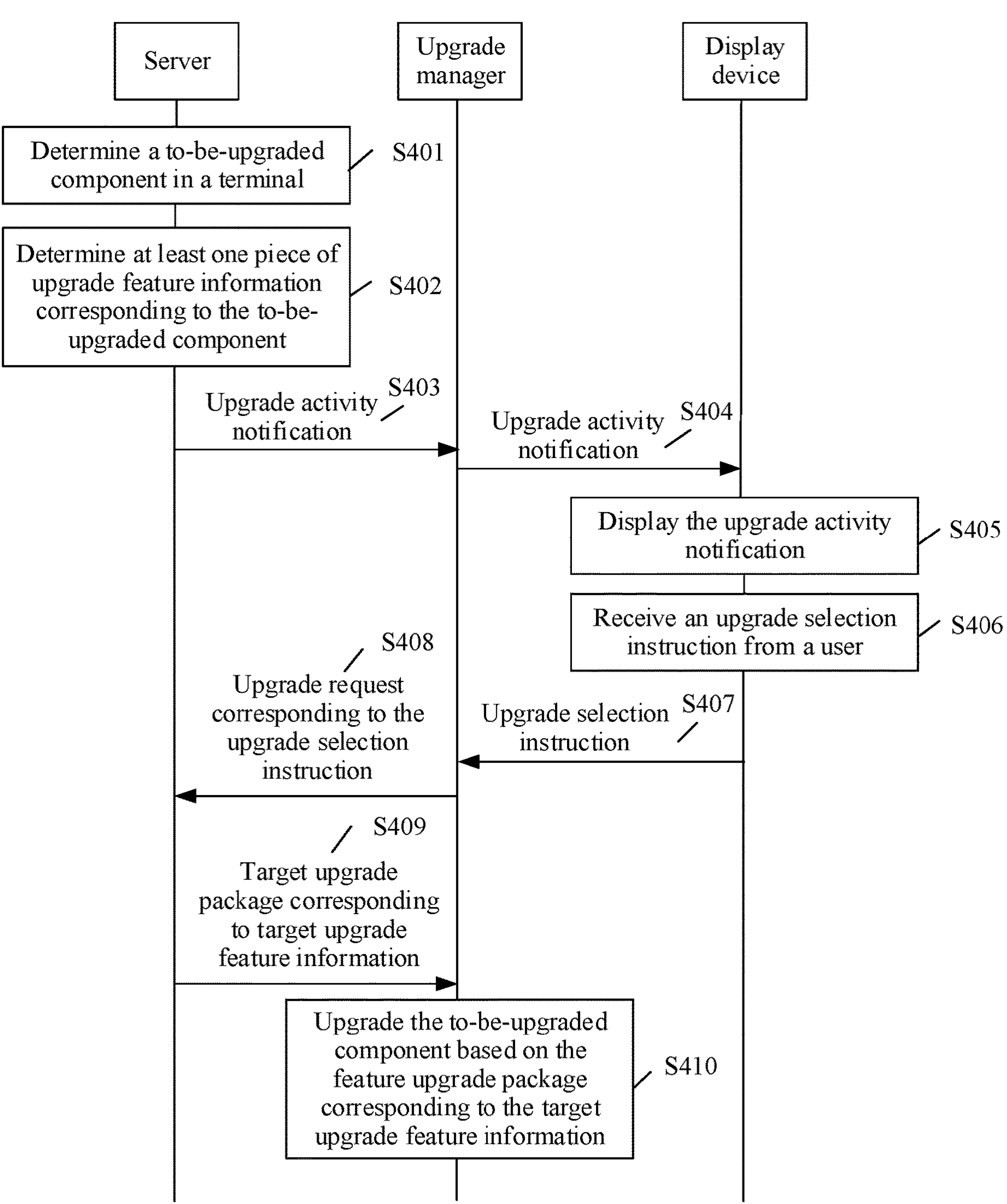
FIG. 4 is a schematic flowchart of another terminal upgrade method according to an embodiment of this application.

FIG. 4 is a schematic flowchart of another terminal upgrade method according to an embodiment of this application. The method includes but is not limited to the following steps S401 to S410.

S401: A server determines a to-be-upgraded component in a terminal.

S402: The server determines at least one piece of upgrade feature information corresponding to the to-be-upgraded component.

For descriptions of step S401 and step S402, refer to the descriptions of step S301 and step S302. Details are not described herein again.

S403: The server sends an upgrade activity notification to an upgrade manager.

S404: The upgrade manager sends the upgrade activity notification to a display device.

S405: The display device displays the upgrade activity notification.

In this embodiment of this application, the upgrade activity notification is used to prompt that the to-be-upgraded component may be upgraded. The upgrade activity notification may include the at least one piece of upgrade feature information corresponding to the to-be-upgraded component. For the upgrade feature information, refer to the foregoing definition or a subsequent supplement. Details are not described herein again. It may be understood that the upgrade activity notification may indicate the upgrade manager to upgrade the to-be-upgraded component. In addition, after the display device displays the upgrade activity notification, a user may select, based on the upgrade feature information in the upgrade activity notification, an upgrade package corresponding to upgrade feature information, so that upgrade accuracy can be improved.

S406: The display device receives an upgrade selection instruction from the user.

S407: The display device sends the upgrade selection instruction to the upgrade manager.

In this embodiment of this application, the upgrade selection instruction includes the target upgrade feature information selected by the user in the upgrade activity notification. As described above, the display device may be deployed inside the terminal, or may be deployed outside the terminal. After receiving the upgrade activity notification, the display device displays the upgrade activity notification. The display device displays the upgrade activity notification, so that human-computer interaction between the user and the server (or the upgrade manager or a vehicle) can be implemented. When the display device displays the upgrade feature information, the user may select to-be-upgraded upgrade feature information on the display device based on the upgrade feature information, use the to-be-upgraded upgrade feature information as the target upgrade feature information, and use an instruction for selecting the target upgrade feature information as the upgrade selection instruction. It may be understood that, the target upgrade feature information is selected based on the upgrade feature information, so that efficiency and accuracy of selecting a feature upgrade package by the user can be improved.

A method for selecting the target upgrade feature information is not limited in this application. An option box corresponding to the upgrade feature information may be separately selected, or an option box corresponding to upgrade feature information not to be upgraded may be selected, that is, a reverse selection is performed, or all or none of upgrade feature information may be selected for an upgrade.

In this embodiment of this application, the upgrade selection instruction includes target upgrade feature information selected by the user in the upgrade activity notification. In other words, the target upgrade feature information is the upgrade feature information selected from the at least one piece of upgrade feature information in the upgrade activity notification. The upgrade selection instruction may be an instruction generated by a corresponding operation of selecting the target upgrade feature information by the user, or may be an instruction generated by a determining operation performed after the selection operation. The determining operation is not limited in this application. The determining operation may be a tapping operation performed by the user on an upgrade determining button displayed at a location corresponding to the upgrade activity notification in the display device, or a sliding gesture of sliding a display on a page of the display device by the user is a preset upgrade determining gesture.

Optionally, if the user does not select the target upgrade feature information when first preset duration expires, or does not perform the determining operation or performs a cancellation operation when second preset duration after the target upgrade feature information is selected expires, the user may determine not to upgrade the vehicle. The first preset duration and the second preset duration may be any specified duration, and may be determined based on a content amplitude of the upgrade activity notification and/or a response speed of the user. This is not limited herein. The cancellation operation is not limited in this application. The cancellation operation may be a tapping operation performed by the user on an upgrade cancellation button displayed at a location corresponding to the upgrade activity notification in the display device, or a sliding gesture of sliding a display on the page of the display device by the user is a preset upgrade cancellation gesture.

S408: The upgrade manager sends an upgrade request corresponding to the upgrade selection instruction to the server.

S409: The server sends a feature upgrade package corresponding to the target upgrade feature information to the upgrade manager.

In this embodiment of this application, the upgrade request requests to receive the feature upgrade package corresponding to the target upgrade feature information. The feature upgrade package corresponding to the target upgrade feature information may be understood as an upgrade package sent by the server to the upgrade manager based on the upgrade request. The server sends the feature upgrade package corresponding to the target upgrade feature information to the upgrade manager, so that the server does not send all feature upgrade packages to the upgrade manager, to reduce an occupied memory in the upgrade manager, and improve upgrade efficiency. S410: The upgrade manager upgrades the to-be-upgraded component based on the feature upgrade package corresponding to the target upgrade feature information.

A method for installing the feature upgrade package is not limited in this application. Refer to the descriptions of step S304. When the feature upgrade package is the feature upgrade package corresponding to the target upgrade feature information, the upgrade manager sends the feature upgrade package corresponding to the target upgrade feature information to the to-be-upgraded component, so that the upgrade manager upgrades the to-be-upgraded component based on the feature upgrade package, or the to-be-upgraded component is upgraded based on the feature upgrade package. This can improve upgrade efficiency and upgrade accuracy.

In the method described in FIG. 4, after determining the to-be-upgraded component in the terminal, the server determines the at least one piece of upgrade feature information corresponding to the to-be-upgraded component, and then sends the upgrade activity notification to the upgrade manager in the terminal. Then, the upgrade manager sends the upgrade activity notification to the display device, so that the user selects the target upgrade feature information based on the at least one piece of upgrade feature information corresponding to the to-be-upgraded component in the upgrade activity notification displayed on the display device. After the display device detects the upgrade selection instruction received by the user based on an operation for the target upgrade feature information, the display device sends the upgrade selection instruction to the upgrade manager, and then the upgrade manager sends the upgrade request corresponding to the upgrade selection instruction to the server. In this way, the target upgrade feature information is selected by displaying, on the display device, the upgrade activity notification that includes the upgrade feature information, so that efficiency and accuracy of user selection can be improved. Then, the server sends the feature upgrade package corresponding to the target upgrade feature information to the upgrade manager, so that the server does not send all feature upgrade packages to the upgrade manager, to reduce the occupied memory in the upgrade manager, and improve upgrade efficiency. After the server sends the feature upgrade package corresponding to the target upgrade feature information to the upgrade manager, the upgrade manager may perform an upgrade based on the feature upgrade package corresponding to the target upgrade feature information, to avoid upgrading all to-be-upgraded components. This can improve an upgrade success rate, efficiency, and accuracy.

Figure 5:
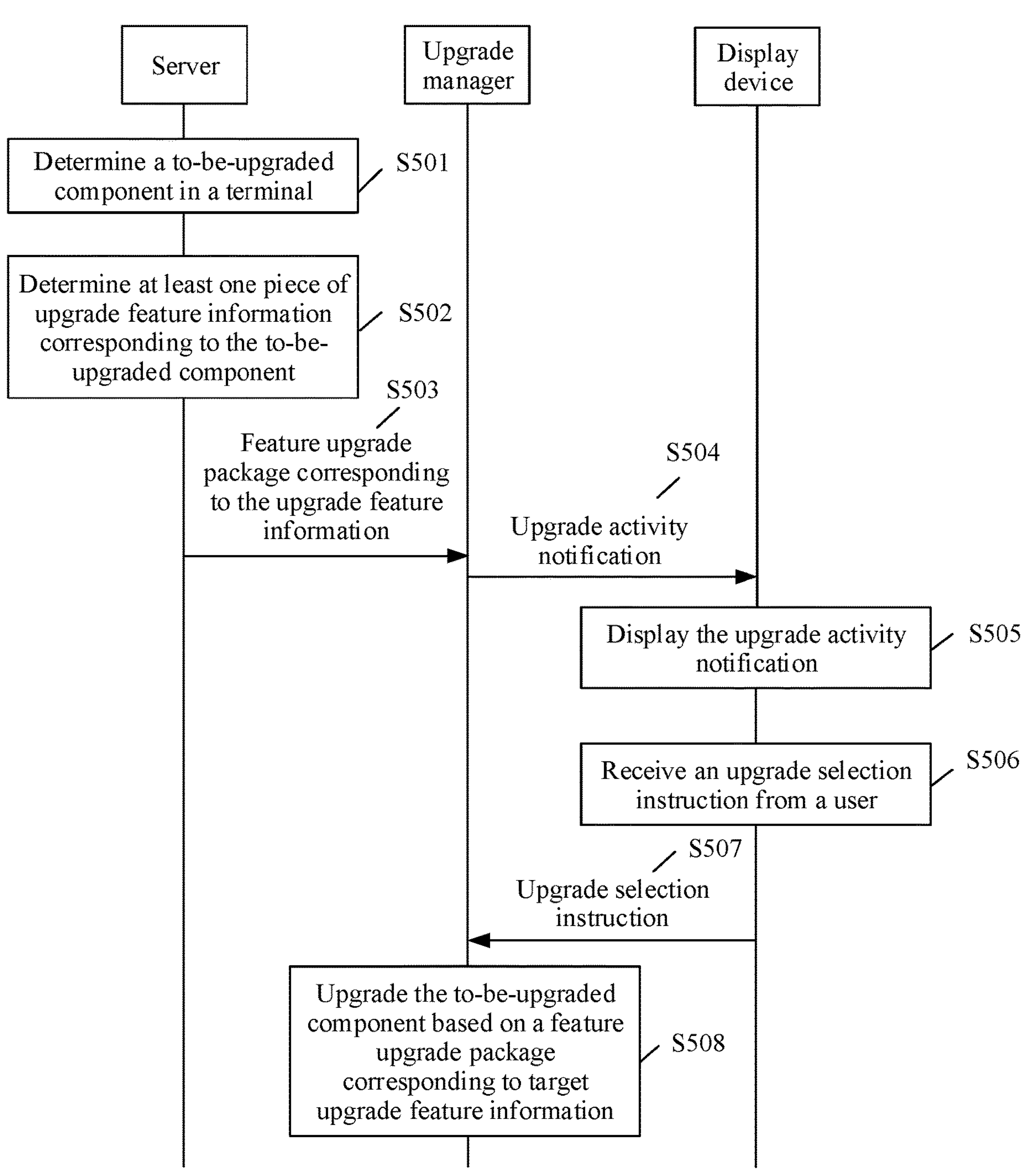
FIG. 5 is a schematic flowchart of another terminal upgrade method according to an embodiment of this application.

FIG. 5 is a schematic flowchart of another terminal upgrade method according to an embodiment of this application. The method includes but is not limited to the following steps S501 to S508.

S501: A server determines a to-be-upgraded component in a terminal.

S502: The server determines at least one piece of upgrade feature information corresponding to the to-be-upgraded component.

S503: The server sends a feature upgrade package corresponding to the upgrade feature information to an upgrade manager.

S504: The upgrade manager sends an upgrade activity notification to a display device.

S505: The display device displays the upgrade activity notification.

S506: The display device receives an upgrade selection instruction from a user.

S507: The display device sends the upgrade selection instruction to the upgrade manager.

For descriptions of step S501 and step S502, refer to the descriptions of step S301 and step S302. For descriptions of steps S503 to S507, refer to the descriptions of steps S403 to S406. Details are not described herein again.

S508: The upgrade manager upgrades the to-be-upgraded component based on a feature upgrade package corresponding to target upgrade feature information.

In the method described in FIG. 5, after determining the to-be-upgraded component in the terminal, the server determines the at least one piece of upgrade feature information corresponding to the to-be-upgraded component, and then sends the feature upgrade package corresponding to the upgrade feature information to the upgrade manager. Then, the upgrade manager sends the upgrade activity notification to the display device, so that the user selects the target upgrade feature information based on the at least one piece of upgrade feature information corresponding to the to-be-upgraded component in the upgrade activity notification displayed on the display device. After the display device detects the upgrade selection instruction received by the user based on an operation for the target upgrade feature information, the display device sends the upgrade selection instruction to the upgrade manager, and then the upgrade manager upgrades the to-be-upgraded component based on the feature upgrade package corresponding to the target upgrade feature information. In this way, the upgrade activity notification including the upgrade feature information is displayed in the display device, so that efficiency and accuracy of user selection can be improved. Then an upgrade is performed based on the feature upgrade package corresponding to the target upgrade feature information selected by the user, so as to avoid upgrading all to-be-upgraded components, so that an upgrade success rate, efficiency, and accuracy can be improved. In addition, for the upgrade feature information that is not selected by the user this time, the upgrade may be performed in an appropriate situation, to avoid repeated interaction with the server.

The methods in embodiments of this application are described above in detail, and apparatuses in embodiments of this application are provided below.

Figure 6:
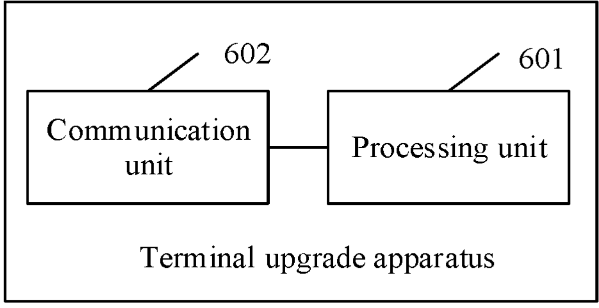
FIG. 6 is a schematic diagram of a structure of a terminal upgrade apparatus according to an embodiment of this application.

FIG. 6 is a schematic diagram of a structure of a terminal upgrade apparatus according to an embodiment of this application. The terminal upgrade apparatus may include a processing unit 601 and a communication unit 602.

When the terminal upgrade apparatus is a server, detailed descriptions of each unit are as follows:

The processing unit 601 is configured to determine a to-be-upgraded component in a terminal, and determine at least one piece of upgrade feature information corresponding to the to-be-upgraded component.

The communication unit 602 is configured to send a feature upgrade package corresponding to the upgrade feature information to an upgrade manager in the terminal, so that the upgrade manager upgrades the to-be-upgraded component based on the feature upgrade package corresponding to the upgrade feature information.

In a possible example, the communication unit 602 is further configured to receive component information from the upgrade manager; and the processing unit 601 is specifically configured to determine the to-be-upgraded component based on the received component information.

In a possible example, the component information includes software and hardware information of each component in the terminal, and the processing unit 601 is specifically configured to compare the received software and hardware information of the component with software and hardware information of the component in the apparatus, to obtain the to-be-upgraded component.

And/or, in a possible example, the component information includes health information of the component, and the processing unit 601 is specifically configured to determine the to-be-upgraded component based on the received health information of the component.

And/or, in a possible example, the component information includes health information of the component and/or upgrade indication information of the to-be-upgraded component, and the processing unit 601 is specifically configured to determine the to-be-upgraded component based on the upgrade indication information.

In a possible example, the health information of the component includes a health value of the component and/or a health level of the component, and the processing unit 601 is specifically configured to select, as the to-be-upgraded component, a component corresponding to the health value that is less than a preset threshold; or select, as the to-be-upgraded component, a component corresponding to the health level that is less than a preset level.

In a possible example, the processing unit 601 is specifically configured to compare the received health information of the component with standard health information of the component, to obtain a health value and/or a health level of the component; and select, as the to-be-upgraded component, a component corresponding to the health value that is less than a preset threshold, or select, as the to-be-upgraded component, a component corresponding to the health level that is less than a preset level.

In a possible example, the communication unit 602 is further configured to receive an upgrade request from the upgrade manager. The upgrade request requests to receive a feature upgrade package corresponding to target upgrade feature information. The target upgrade feature information is upgrade feature information selected by a user from an upgrade activity notification displayed on a display device. The upgrade activity notification includes the at least one piece of upgrade feature information corresponding to the to-be-upgraded component.

The communication unit 602 is specifically configured to send the feature upgrade package corresponding to the target upgrade feature information to the upgrade manager.

In a possible example, the communication unit 602 is further configured to send the upgrade activity notification to the upgrade manager.

In a possible example, the communication unit 602 is further configured to send upgrade prompt information to the upgrade manager. The upgrade prompt information includes estimated upgrade duration of the upgrade feature package.

When the terminal upgrade apparatus is an upgrade manager in a terminal, detailed descriptions of each unit are as follows:

The communication unit 602 is configured to receive a feature upgrade package from a server. The feature upgrade package corresponds to at least one piece of upgrade feature information that corresponds to a to-be-upgraded component in a terminal and that is determined by the server.

The processing unit 601 is configured to upgrade the to-be-upgraded component based on the feature upgrade package corresponding to the upgrade feature information.

In a possible example, the communication unit 602 is further configured to send component information of each component in the terminal to the server.

In a possible example, the component information includes health information of the component, and the communication unit 602 is further configured to receive health information from the component.

In a possible example, the component information includes health information of the component, and the communication unit 602 is further configured to receive a performance parameter of the component. The processing unit 601 is further configured to determine the health information of the component based on the performance parameter.

In a possible example, the communication unit 602 is further configured to send an upgrade activity notification to a display device, so that the display device displays the upgrade activity notification, where the upgrade activity notification includes the upgrade feature information.

In a possible example, the communication unit 602 is further configured to receive an upgrade selection instruction from the display device. The upgrade selection instruction includes target upgrade feature information selected by a user from the upgrade activity notification. The processing unit 601 is specifically configured to upgrade the to-be-upgraded component based on a feature upgrade package corresponding to the target upgrade feature information.

In a possible example, the communication unit 602 is further configured to receive the upgrade activity notification from the server.

In a possible example, the communication unit 602 is further configured to send an upgrade request corresponding to the upgrade selection instruction to the server. The upgrade request requests to receive the feature upgrade package corresponding to the target upgrade feature information.

The communication unit 602 is specifically configured to receive, from the server, the feature upgrade package corresponding to the target upgrade feature information.

In a possible example, the communication unit 602 is further configured to send an upgrade complete message to the display device, so that the display device displays the upgrade complete message. The upgrade complete message indicates that upgrading of the feature upgrade package is completed.

In a possible example, the communication unit 602 is further configured to receive the upgrade complete message from the to-be-upgraded component.

In a possible example, the communication unit 602 is further configured to send the feature upgrade package to the to-be-upgraded component, so that the to-be-upgraded component upgrades the to-be-upgraded component based on the feature upgrade package.

In a possible example, the communication unit 602 is further configured to send upgrade prompt information to the display device, so that the display device displays the upgrade prompt information, where the upgrade prompt information includes estimated upgrade duration of the upgrade feature package.

In a possible example, the communication unit 602 is further configured to receive the upgrade prompt information from the server.

In a possible example, the communication unit 602 is further configured to receive, based on the upgrade prompt information, an upgrade confirmation instruction from the display device. The upgrade confirmation instruction includes indication information for confirming installation of the feature upgrade package.

When the terminal upgrade apparatus is a to-be-upgraded component in the terminal, detailed descriptions of each unit are as follows:

The communication unit 602 is configured to receive a feature upgrade package from an upgrade manager in the terminal. The to-be-upgraded component is a to-be-upgraded component that is determined by a server and that is in the terminal. The feature upgrade package corresponds to at least one piece of upgrade feature information corresponding to the to-be-upgraded component.

The processing unit 601 is configured to upgrade the to-be-upgraded component based on the feature upgrade package.

In a possible example, the feature upgrade package is target upgrade feature information, the target upgrade feature information is upgrade feature information selected by a user from an upgrade activity notification, and the upgrade activity notification is information sent by the upgrade manager to a display device for display, and includes the at least one piece of upgrade feature information corresponding to the to-be-upgraded component.

In a possible example, the upgrade activity notification is information received by the upgrade manager from the server.

In a possible example, the communication unit 602 is further configured to send an upgrade complete message to the upgrade manager. The upgrade complete message indicates that the to-be-upgraded component completes upgrading of the feature upgrade package.

When the terminal upgrade apparatus is a display device, detailed descriptions of each unit are as follows:

The communication unit 602 is configured to receive an upgrade activity notification from an upgrade manager in a terminal. The upgrade activity notification includes at least one piece of upgrade feature information of a to-be-upgraded component, and the to-be-upgraded component is a to-be-upgraded component determined by a server.

The processing unit 601 is configured to display the upgrade activity notification.

The communication unit 602 is further configured to receive an upgrade selection instruction from a user. The upgrade selection instruction is target upgrade feature information selected by the user from the upgrade activity notification.

The processing unit 601 is further configured to send the upgrade selection instruction to the upgrade manager.

In a possible example, the communication unit 602 is further configured to receive an upgrade complete message from the upgrade manager. The upgrade complete message indicates that upgrading of the feature upgrade package is completed. The processing unit 601 is further configured to display the upgrade complete message.

In a possible example, the communication unit 602 is further configured to receive upgrade prompt information from the upgrade manager. The upgrade prompt information includes estimated upgrade duration of the upgrade feature package. The processing unit 601 is further configured to display the upgrade prompt information.

In a possible example, the communication unit 602 is further configured to receive an upgrade confirmation instruction from the user, where the upgrade confirmation instruction includes indication information for confirming installation of the feature upgrade package; and send the upgrade confirmation instruction to the upgrade manager.

In the foregoing examples, the upgrade feature information includes an upgrade feature type.

In the foregoing examples, the upgrade feature information further includes feature description information corresponding to the upgrade feature type, and the feature description information includes at least one of the following: a recommendation level, an involved function, an involved component, estimated upgrade duration, an upgrade reason, and an upgrade category.

It should be noted that, for implementation of each unit, refer to the corresponding descriptions of the method embodiment shown in FIG. 3, FIG. 4, or FIG. 5.

Figure 7:
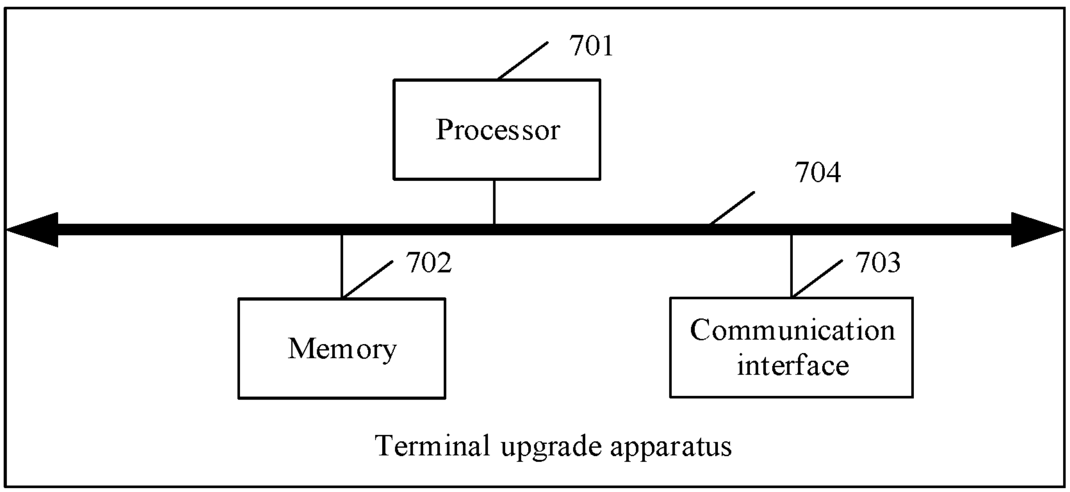
FIG. 7 is a schematic diagram of another structure of a terminal upgrade apparatus according to an embodiment of this application.

FIG. 7 shows another terminal upgrade apparatus according to an embodiment of this application. The apparatus includes a processor 701, a memory 702, and a communication interface 703. The processor 701, the memory 702, and the communication interface 703 are connected to each other through a bus 704.

The memory 702 includes but is not limited to a RAM, a ROM, an erasable programmable read-only memory (EPROM), or a compact disc read-only memory (CD-ROM). The memory 702 is configured to store related instructions and related data. The communication interface 703 is configured to receive and send data.

The processor 701 may be one or more central processing units (CPUs). When the processor 701 is one CPU, the CPU may be a single-core CPU or a multi-core CPU.

When the apparatus is a server, the processor 701 is configured to read program code stored in the memory 702, to perform the following operations: determining a to-be-upgraded component in a terminal; determining at least one piece of upgrade feature information corresponding to the to-be-upgraded component; and sending a feature upgrade package corresponding to the upgrade feature information to an upgrade manager in the terminal, so that the upgrade manager upgrades the to-be-upgraded component based on the feature upgrade package corresponding to the upgrade feature information.

In a possible example, in terms of determining the to-be-upgraded component in the terminal, the processor 701 is specifically configured to perform the following operations: receiving component information from the upgrade manager; and determining the to-be-upgraded component based on the received component information.

In a possible example, the component information includes software and hardware information of each component in the terminal. In terms of determining the to-be-upgraded component based on the received component information, the processor 701 is specifically configured to perform the following operation: comparing the received software and hardware information of the component with software and hardware information of the component in the apparatus, to obtain the to-be-upgraded component.

Alternatively, in a possible example, the component information includes health information of the component, and the processor 701 is specifically configured to perform the following operation: determining the to-be-upgraded component based on the received health information of the component.

Alternatively, in a possible example, the component information includes upgrade indication information of the to-be-upgraded component, and the processor 701 is specifically configured to perform the following operation: determining the to-be-upgraded component based on the upgrade indication information.

In a possible example, the health information of the component includes a health value of the component and/or a health level of the component. In terms of determining the to-be-upgraded component based on the received health information of the component, the processor 701 is specifically configured to perform the following operation: selecting, as the to-be-upgraded component, a component corresponding to the health value that is less than a preset threshold; or selecting, as the to-be-upgraded component, a component corresponding to the health level that is less than a preset level.

In a possible example, in terms of determining the to-be-upgraded component based on the received health information of the component, the processor 701 is specifically configured to perform the following operations: comparing the received health information of the component with standard health information of the component, to obtain a health value and/or a health level of the component; and selecting, as the to-be-upgraded component, a component corresponding to the health value that is less than a preset threshold; or selecting, as the to-be-upgraded component, a component corresponding to the health level that is less than a preset level.

In a possible example, before sending the feature upgrade package corresponding to the upgrade feature information to the upgrade manager in the terminal, the processor 701 is further configured to perform the following operation: receiving an upgrade request from the upgrade manager, where the upgrade request requests to receive a feature upgrade package corresponding to target upgrade feature information, the target upgrade feature information is upgrade feature information selected by a user from an upgrade activity notification displayed on a display device, and the upgrade activity notification includes the at least one piece of upgrade feature information corresponding to the to-be-upgraded component; and the sending a feature upgrade package corresponding to the upgrade feature information to an upgrade manager in the terminal includes sending the feature upgrade package corresponding to the target upgrade feature information to the upgrade manager.

In a possible example, before receiving the upgrade request from the upgrade manager, the processor 701 is further configured to perform the following operation: sending the upgrade activity notification to the upgrade manager in the terminal.

In a possible example, the processor 701 is further configured to perform the following operation: sending upgrade prompt information to the upgrade manager, where the upgrade prompt information includes estimated upgrade duration of the upgrade feature package.

When the apparatus is an upgrade manager in a terminal, the processor 701 is configured to read program code stored in the memory 702, to perform the following operations: receiving a feature upgrade package from a server, where the feature upgrade package corresponds to at least one piece of upgrade feature information that corresponds to a to-be-upgraded component in the terminal and that is determined by the server; and upgrading the to-be-upgraded component based on the feature upgrade package corresponding to the upgrade feature information.

In a possible example, before receiving the feature upgrade package from the server, the processor 701 is further configured to perform the following operation: sending component information of each component in the terminal to the server.

In a possible example, the component information includes health information of the component. Before sending the component information of each component in the terminal to the server, the processor 701 is further configured to perform the following operation: receiving the health information of the component.

Alternatively, in a possible example, the component information includes health information of the component. Before sending the component information of each component in the terminal to the server, the processor 701 is further configured to perform the following operation: receiving a performance parameter of the component, and determining the health information of the component based on the performance parameter.

In a possible example, the processor 701 is further configured to perform the following operation: sending an upgrade activity notification to a display device, so that the display device displays the upgrade activity notification, where the upgrade activity notification includes the upgrade feature information.

In a possible example, before sending the upgrade activity notification to the display device, the processor 701 is further configured to perform the following operation: receiving an upgrade selection instruction from the display device, where the upgrade selection instruction includes target upgrade feature information selected by a user from the upgrade activity notification.

In terms of upgrading the to-be-upgraded component based on the feature upgrade package corresponding to the upgrade feature information, the processor 701 is specifically configured to perform the following operation: upgrading the to-be-upgraded component based on a feature upgrade package corresponding to the target upgrade feature information.

In a possible example, before receiving the upgrade selection instruction from the display device, the processor 701 is further configured to perform the following operation: receiving the upgrade activity notification from the server.

In a possible example, after receiving the upgrade selection instruction from the display device, the processor 701 is further configured to perform the following operation: sending an upgrade request corresponding to the upgrade selection instruction to the server, where the upgrade request requests to receive the feature upgrade package corresponding to the target upgrade feature information.

In terms of receiving the feature upgrade package from the server, the processor 701 is specifically configured to perform the following operation: receiving, from the server, the feature upgrade package corresponding to the target upgrade feature information.

In a possible example, the processor 701 is further configured to perform the following operation: sending an upgrade complete message to the display device, so that the display device displays the upgrade complete message, where the upgrade complete message indicates that upgrading of the feature upgrade package is completed.

In a possible example, before sending the upgrade complete message to the display device, the processor 701 is further configured to perform the following operation: receiving the upgrade complete message from the to-be-upgraded component.

In a possible example, in terms of upgrading the to-be-upgraded component based on the feature upgrade package corresponding to the upgrade feature information, the processor 701 is specifically configured to perform the following operation: sending the feature upgrade package to the to-be-upgraded component, so that the to-be-upgraded component upgrades the to-be-upgraded component based on the feature upgrade package.

In a possible example, the processor 701 is further configured to perform the following operation: sending upgrade prompt information to the display device, so that the display device displays the upgrade prompt information, where the upgrade prompt information includes estimated upgrade duration of the upgrade feature package.

In a possible example, before sending the upgrade prompt information to the display device, the processor 701 is further configured to perform the following operation: receiving the upgrade prompt information from the server.

In a possible example, after sending the upgrade prompt information to the display device, the processor 701 is further configured to perform the following operation: In a possible example, receiving an upgrade confirmation instruction from the display device based on the upgrade prompt information, where the upgrade confirmation instruction includes indication information for confirming installation of the feature upgrade package.

When the apparatus is a to-be-upgraded component in a terminal, the processor 701 is configured to read program code stored in the memory 702, to perform the following operations: receiving a feature upgrade package from an upgrade manager in the terminal, where the to-be-upgraded component is a to-be-upgraded component that is determined by a server and that is in the terminal, and the feature upgrade package corresponds to at least one piece of upgrade feature information corresponding to the to-be-upgraded component; and upgrading the to-be-upgraded component based on the feature upgrade package.

In a possible example, the feature upgrade package is target upgrade feature information, the target upgrade feature information is upgrade feature information selected by a user from an upgrade activity notification, and the upgrade activity notification is information sent by the upgrade manager to a display device for display, and includes the at least one piece of upgrade feature information corresponding to the to-be-upgraded component.

In a possible example, the upgrade activity notification is information received by the upgrade manager from the server.

In a possible example, after upgrading the to-be-upgraded component based on the feature upgrade package, the processor 701 is further configured to perform the following operation: sending an upgrade complete message to the upgrade manager, where the upgrade complete message indicates that the to-be-upgraded component completes upgrading of the feature upgrade package.

When the apparatus is a display device, the processor 701 is configured to read program code stored in the memory 702, to perform the following operations: receiving an upgrade activity notification from an upgrade manager in a terminal, where the upgrade activity notification includes at least one piece of upgrade feature information of a to-be-upgraded component, and the to-be-upgraded component is a to-be-upgraded component determined by a server; displaying the upgrade activity notification; receiving an upgrade selection instruction from a user, where the upgrade selection instruction is target upgrade feature information selected by the user from the upgrade activity notification; and sending the upgrade selection instruction to the upgrade manager.

In a possible example, the processor 701 is further configured to perform the following operations: receiving an upgrade complete message from the upgrade manager, where the upgrade complete message indicates that upgrading of the feature upgrade package is completed; and displaying the upgrade complete message.

In a possible example, the processor 701 is further configured to perform the following operations: receiving upgrade prompt information from the upgrade manager, where the upgrade prompt information includes estimated upgrade duration of the upgrade feature package; and displaying the upgrade prompt information.

In a possible example, the processor 701 is further configured to perform the following operations: receiving an upgrade confirmation instruction from the user, where the upgrade confirmation instruction includes indication information for confirming installation of the feature upgrade package; and sending the upgrade confirmation instruction to the upgrade manager.

In the foregoing examples, the upgrade feature information includes an upgrade feature type.

In the foregoing examples, the upgrade feature information further includes feature description information corresponding to the upgrade feature type, and the feature description information includes at least one of the following: a recommendation level, an involved function, an involved component, estimated upgrade duration, an upgrade reason, and an upgrade category.

It should be noted that, for implementation of each operation, refer to the corresponding descriptions of the method embodiment shown in FIG. 3, FIG. 4, or FIG. 5.

An embodiment of this application further provides a chip system. The chip system includes at least one processor, a memory, and an interface circuit. The memory, a transceiver, and the at least one processor are interconnected through a line. The at least one memory stores instructions. When the instructions are executed by the processor, the method procedures shown in FIG. 3, FIG. 4, or FIG. 5 are implemented.

An embodiment of this application further provides a computer-readable storage medium. The computer-readable storage medium stores instructions. When the instructions are run on a network device, the method procedures shown in FIG. 3, FIG. 4, or FIG. 5 are implemented.

An embodiment of this application further provides a computer program product. When the computer program product runs on a terminal, the method procedures shown in FIG. 3, FIG. 4, or FIG. 5 are implemented.

In conclusion, in embodiments of this application, after determining the to-be-upgraded component in the terminal, the server determines the at least one piece of upgrade feature information corresponding to the to-be-upgraded component, and then sends the feature upgrade package corresponding to the upgrade feature information to the upgrade manager. Then, the upgrade manager upgrades the to-be-upgraded component based on the feature upgrade package corresponding to the upgrade feature information. In this way, an upgrade may not be performed on an entire terminal, to improve an upgrade success rate. In addition, upgrade efficiency and accuracy can be improved by upgrading the to-be-upgraded component based on the feature upgrade package corresponding to the upgrade feature information.

All or some of the foregoing embodiments may be implemented by using software, hardware, firmware, or any combination thereof. When the software is used to implement embodiments, all or some of embodiments may be implemented in a form of a computer instruction product. When the computer instructions are loaded and executed on a computer, all or some of the procedures or functions according to embodiments of this application can be implemented. The computer may be a general-purpose computer, a special-purpose computer, a computer network, or another programmable apparatus. The computer instructions may be stored in a computer-readable storage medium, or may be transmitted by using a computer-readable storage medium. The computer-readable storage medium may be any usable medium accessible by the computer, or may be a data storage device, for example, a server or a data center that integrates one or more usable media. The usable medium may be a magnetic medium (for example, a floppy disk, a hard disk drive, or a magnetic tape), an optical medium (for example, a DVD), a semiconductor medium (for example, a solid-state disk (SSD)), or the like.

Sequence adjustment, combination, and deletion may be performed on the steps in the method embodiments of this application based on an actual requirement.

Combination, division, and deletion may be performed on the modules in the apparatus embodiments of this application based on an actual requirement.

What is claimed is:

1. A method applied to a server and comprising:
- determining a to-be-upgraded component in a terminal;
- determining upgrade feature information corresponding to the to-be-upgraded component, wherein the upgrade feature information comprises:
  - an upgrade feature type; and
  - feature description information corresponding to the upgrade feature type, wherein the feature description information comprises involved components, and wherein the involved components comprises:
    - the to-be-upgraded component;
    - a first involved component;
    - a second involved component;
    - an upgrade association relationship indicating that the to-be-upgraded component is independent of both the first involved component and the second involved component, wherein the upgrade association relationship further indicates that the first involved component is associated with the second involved component; and
    - an upgrade sequence relationship indicating an upgrade sequence for the first involved component and the second involved component; and
- sending, to an upgrade manager in the terminal, a first feature upgrade package corresponding to the upgrade feature information to prompt instruct the upgrade manager to upgrade the to-be-upgraded component based on the first feature upgrade package.

2. The method of claim 1, wherein the feature description information further comprises at least one of a recommendation level, an involved function, an estimated upgrade duration, an upgrade reason, or an upgrade category.

3. The method of claim 1, wherein determining the to-be-upgraded component in the terminal comprises:

receiving component information from the upgrade manager; and determining the to-be-upgraded component based on the component information.

4. The method of claim 1, wherein before sending the first feature upgrade package to the upgrade manager in the terminal, the method further comprises receiving an upgrade request from the upgrade manager, wherein the upgrade request requests to receive a second feature upgrade package corresponding to target upgrade feature information, wherein the target upgrade feature information is based on selection by a user from an upgrade activity notification displayed on a display device, wherein the upgrade activity notification comprises the upgrade feature information corresponding to the to-be-upgraded component, and wherein sending the first feature upgrade package to the upgrade manager in the terminal comprises sending the second feature upgrade package to the upgrade manager.

5. A method applied to an upgrade manager in a terminal and comprising:

receiving, from a server, a feature upgrade package corresponding to upgrade feature information that corresponds to a to-be-upgraded component in the terminal, wherein the upgrade feature information comprises:

an upgrade feature type; and feature description information corresponding to the upgrade feature type, wherein the feature description information comprises involved components, and wherein the involved components comprises:

the to-be-upgraded component;

a first involved component;

a second involved component;

an upgrade association relationship indicating that the to-be-upgraded component is independent of both the first involved component and the second involved component, wherein the upgrade association relationship further indicates that the first involved component is associated with the second involved component; and an upgrade sequence relationship indicating an upgrade sequence for the first involved component and the second involved component; and upgrading the to-be-upgraded component based on the feature upgrade package.

6. The method of claim 5, wherein the feature description information further comprises at least one of a recommendation level, an involved function, an estimated upgrade duration, an upgrade reason, or an upgrade category.

7. The method of claim 5, wherein before receiving the feature upgrade package, the method further comprises sending component information of each component in the terminal to the server.

8. The method of claim 7, wherein the component information comprises health information of the component, and wherein before sending the component information of each component in the terminal to the server, the method further comprises:

receiving the health information of the component.

9. An apparatus, comprising:

a memory storing programming instructions; and at least one processor coupled to the memory and configured to execute the programming instructions to cause the apparatus to:

determine a to-be-upgraded component in a terminal;

determine upgrade feature information corresponding to the to-be-upgraded component, wherein the upgrade feature information comprises:

an upgrade feature type; and feature description information corresponding to the upgrade feature type, wherein the feature description information comprises involved components, and wherein the involved components comprises:

the to-be-upgraded component;

a first involved component;

a second involved component;

an upgrade association relationship indicating that the to-be-upgraded component is independent of both the first involved component and the second involved component, wherein the upgrade association relationship further indicates that the first involved component is associated with the second involved component; and an upgrade sequence relationship indicating an upgrade sequence for the first involved component and the second involved component; and send a first feature upgrade package corresponding to the upgrade feature information to an upgrade manager in the terminal to instruct the upgrade manager to upgrade the to-be-upgraded component based on the first feature upgrade package.

10. The apparatus of claim 9, wherein the feature description information further comprises at least one of a recommendation level, an involved function, an estimated upgrade duration, an upgrade reason, or an upgrade category.

11. The apparatus of claim 9, wherein the at least one processor is further configured to execute the programming instructions to cause the apparatus to:

receive component information from the upgrade manager; and determine the to-be-upgraded component based on the component information.

12. The apparatus of claim 9, wherein the at least one processor is further configured to execute the programming instructions to cause the apparatus to:

receive an upgrade request from the upgrade manager, wherein the upgrade request requests to receive a second feature upgrade package corresponding to target upgrade feature information, wherein the target upgrade feature information is based on selection by a user from an upgrade activity notification displayed on a display device, and wherein the upgrade activity notification comprises the upgrade feature information corresponding to the to-be-upgraded component; and send the second feature upgrade package to the upgrade manager.

13. An apparatus, comprising:

a memory storing programming instructions; and at least one processor coupled to the memory and configured to execute the programming instructions to cause the apparatus to:

receive, from a server, a feature upgrade package corresponding to upgrade feature information that corresponds to a to-be-upgraded component in a terminal and that is determined by the server, wherein the upgrade feature information comprises:

an upgrade feature type; and feature description information corresponding to the upgrade feature type, wherein the feature description information comprises involved components, and wherein the involved components comprises:

the to-be-upgraded component;

a first involved component;

a second involved component;

an upgrade association relationship indicating that the to-be-upgraded component is independent of both the first involved component and the second involved component, wherein the upgrade association relationship further indicates that the first involved component is associated with the second involved component; and an upgrade sequence relationship indicating an upgrade sequence for the first involved component and the second involved component; and upgrade the to-be-upgraded component based on the feature upgrade package.

14. The apparatus of claim 13, wherein the feature description information further comprises at least one of a recommendation level, an involved function, an estimated upgrade duration, an upgrade reason, or an upgrade category.

15. The apparatus of claim 13, wherein the at least one processor is further configured to execute the programming instructions to cause the apparatus to send component information of each component in the terminal to the server.

16. The apparatus of claim 15, wherein the component information comprises health information of the component, and wherein the at least one processor is further configured to execute the programming instructions to cause the apparatus to:

receive a performance parameter of the component for determining the health information of the component.

17. The method of claim 2, wherein the feature description information comprises the recommendation level, and wherein the method further comprises determining the recommendation level based on a preset category of the to-be-upgraded component and upgrade package information of the to-be-upgraded component.

18. The method of claim 6, wherein the feature description information comprises the recommendation level, and wherein the recommendation level is based on a preset category of the to-be-upgraded component and upgrade package information of the to-be-upgraded component.

19. The apparatus of claim 10, wherein the feature description information comprises the recommendation level, and wherein the at least one processor is further configured to execute the programming instructions to cause the apparatus to determine the recommendation level based on a preset category of the to-be-upgraded component and upgrade package information of the to-be-upgraded component.

20. The apparatus of claim 14, wherein the feature description information comprises the recommendation level, and wherein the recommendation level is based on a preset category of the to-be-upgraded component and upgrade package information of the to-be-upgraded component.

* * * * *